US012340795B2

(12) United States Patent
Koneru et al.

(10) Patent No.: US 12,340,795 B2
(45) Date of Patent: Jun. 24, 2025

(54) SYSTEMS AND METHODS OF IMPLEMENTING PLATFORMS FOR BOT INTERFACES WITHIN AN INTELLIGENT DEVELOPMENT PLATFORM

(71) Applicant: Kore.ai, Inc., Orlando, FL (US)

(72) Inventors: Rajkumar Koneru, Windermere, FL (US); Prasanna Kumar Arikala Gunalan, Hyderabad (IN); Girish Ahankari, Hyderabad (IN); Santhosh Kumar Myadam, Hyderabad (IN)

(73) Assignee: KORE.AI, INC., Orlando, FL (US)

( * ) Notice: Subject to any disclaimer, the term of this patent is extended or adjusted under 35 U.S.C. 154(b) by 119 days.

(21) Appl. No.: 17/238,866

(22) Filed: Apr. 23, 2021

(65) Prior Publication Data
US 2022/0343901 A1 Oct. 27, 2022

(51) Int. Cl.
| | | |
|---|---|---|
| G10L 15/22 | (2006.01) | |
| G06F 8/34 | (2018.01) | |
| G06F 16/21 | (2019.01) | |
| G06F 16/28 | (2019.01) | |
| G06F 40/35 | (2020.01) | |
| G10L 15/08 | (2006.01) | |
| G10L 15/18 | (2013.01) | |
| G06F 3/0484 | (2022.01) | |
| G06F 16/901 | (2019.01) | |
| G06F 40/30 | (2020.01) | |

(52) U.S. Cl.
CPC ............ G10L 15/083 (2013.01); G06F 8/34 (2013.01); G06F 16/211 (2019.01); G06F 16/288 (2019.01); G06F 40/35 (2020.01); G10L 15/1815 (2013.01); G10L 15/22 (2013.01); *G06F 3/0484* (2013.01); *G06F 16/9027* (2019.01); *G06F 40/30* (2020.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 6,738,964 B1 * | 5/2004 | Zink | ....................... | G06F 30/30 |
| | | | | 717/109 |
| 7,007,235 B1 * | 2/2006 | Hussein | ................. | G06Q 10/10 |
| | | | | 715/753 |
| 9,196,245 B2 | 11/2015 | Larcheveque et al. | | |
| 10,162,817 B2 * | 12/2018 | Schlesinger | ............ | H04L 51/02 |

(Continued)

FOREIGN PATENT DOCUMENTS

| | | |
|---|---|---|
| EP | 3407283 A1 | 11/2018 |
| JP | 2014238820 A * | 12/2014 |

OTHER PUBLICATIONS

English translation of JP2014238820 A (Year: 2014).*

(Continued)

*Primary Examiner* — Richard Z Zhu
(74) *Attorney, Agent, or Firm* — Troutman Pepper Locke LLP

(57) ABSTRACT

The present disclosure relates to the development and design of bot interfaces and, more particularly, to one or more components, systems and methods of an intelligent development and design platform configured to assist users in the design, development and deployment of bot applications.

24 Claims, 26 Drawing Sheets

(56) References Cited

U.S. PATENT DOCUMENTS

| | | | |
|---|---|---|---|
| 10,452,251 B2 | 10/2019 | Yaseen et al. | |
| 10,608,966 B1* | 3/2020 | Landowski | H04L 51/02 |
| 10,628,133 B1* | 4/2020 | Jiang | H04L 51/02 |
| 10,678,406 B1 | 6/2020 | Banfi | |
| 10,699,708 B2 | 6/2020 | Lecue et al. | |
| 10,819,664 B2* | 10/2020 | Nahum | H04L 63/0884 |
| 11,030,412 B2* | 6/2021 | Shanmugam | G06F 16/951 |
| 11,231,826 B2* | 1/2022 | Gelfenbeyn | G06F 40/35 |
| 11,321,535 B2* | 5/2022 | Elson | G06F 16/2246 |
| 11,394,667 B2* | 7/2022 | Bobbarjung | H04L 51/02 |
| 11,741,313 B2* | 8/2023 | Aubineau | G06F 40/35 704/9 |
| 2007/0203869 A1* | 8/2007 | Ramsey | G06F 40/35 706/52 |
| 2014/0028780 A1* | 1/2014 | Croen | H04N 7/147 348/14.03 |
| 2017/0293834 A1* | 10/2017 | Raison | G06F 40/40 |
| 2018/0054464 A1* | 2/2018 | Zhang | H04L 51/02 |
| 2018/0090141 A1* | 3/2018 | Periorellis | G10L 15/1815 |
| 2018/0129484 A1 | 5/2018 | Kannan et al. | |
| 2018/0131642 A1* | 5/2018 | Trufinescu | G10L 15/22 |
| 2019/0132264 A1* | 5/2019 | Jafar Ali | G06F 40/295 |
| 2019/0266280 A1 | 8/2019 | Acampado | |
| 2020/0105255 A1 | 4/2020 | Huang et al. | |
| 2020/0160458 A1* | 5/2020 | Bodin | G06F 8/33 |
| 2020/0334568 A1 | 10/2020 | Liden et al. | |
| 2020/0387550 A1* | 12/2020 | Cappetta | G06F 16/9538 |
| 2021/0157990 A1* | 5/2021 | Lima | G06F 40/216 |

OTHER PUBLICATIONS

Banfi, V., Mar. 23, 2018. Introducing: One click Dialogflow integration and deploy. [online] Botsociety Blog. Available at: <https://botsociety.io/blog/2018/03/introducing-dialogflow-integration/> [Accessed Nov. 29, 2021].

Oracle Help Center. Mar. 21, 2019. Using Oracle Digital Assistant. [online] Available at: <https://docs.oracle.com/en/cloud/paas/digital-assistant/use-chatbot/conversation-designer1.html#GUID-FC887D2E-281F-453C-A753-C48299FAC947> [Accessed Nov. 29, 2021].

Botsociety, Jul. 1, 2020. Botsociety complete tutorial—From idea to handoff. [video] Available at: <https://www.youtube.com/watch?v=9ekITSQUZbU> [Accessed Nov. 29, 2021].

* cited by examiner please confirm your mobile number (612a)

Label(s)
- Exceeds retries     614
- Valid Input
- Asks another intent
- Asks for amend entities
- Provides multiple values

*FIG. 6C* please confirm your mobile number (612a)

Label(s): Exceeds retries          (614)

Please provide your account information (612)   ⊕  616

*FIG. 6D*

What's my balance

I will help you with that. Please enter your phone number.

Sorry, I would like to check your credit card offers first.

*Label* [Ask another intent ▽]

Please enter your phone number 417 345 2453

[Logic: Use the phone number to call API1, retrieve Credit cards and their offers from the API1. Check the offers applicable to this phone number based on the area code]    630

Here are our credit cards: CC1, CC2, CC3. Select one to know more.

Scene Timeline

The scene timeline is a visual guideline for the key events added to your scene. Notes added with # are automatically added to this timeline.

For example: #Start_Intent 1, #Hold_Intent 1, #Start 2, #Resume_Intent 1, #End_Intent 1

○ Start
Starting point of the conversati..
Start_Intent

‖ Hold
In-between step of the convers..
Hold_Intent

○ Start
Starting point of another conve..
Start_Intent

▷ Resume
In-between step of the convers..
Resume_Intent

☐ End
Termination point of any conve..

*FIG. 6G*

| | |
|---|---|
| SceneId | S1 |
| User | I want to Book flight |
| Bot | From where? |
| User | from New York |
| Bot | To where? |
| User | to Florida |
| Bot | Sure, When do you want to travel |
| User | 25th of March |
| Bot | Thank you, Your flight is booked for 25th of March |

*FIG. 12A*

SceneMessage Table

| messageId | SceneId | SeqNum | parentMessageId | transitions | messageText | messageType |
|---|---|---|---|---|---|---|
| V1 | S1 | 1 | | {'default' V2} | I want to Book flight | USER_MESSAGE |
| V2 | S1 | 2 | V1 | {'default' V4} | From where? | BOT_MESSAGE_QUESTION |
| V3 | S1 | 3 | V2 | | from New York | USER_MESSAGE |
| V4 | S1 | 4 | V3 | {'default' V6} | To where? | BOT_MESSAGE_QUESTION |
| V5 | S1 | 5 | V4 | | to Florida | USER_MESSAGE |
| V6 | S1 | 6 | V5 | {'default' V8} | Sure, When do you want to travel | BOT_MESSAGE_QUESTION |
| V7 | S1 | 7 | V6 | | 25th of March | USER_MESSAGE |
| V8 | S1 | 8 | V7 | {'default' END_DIALOG} | Thank you, Your flight is booked for 25th of March | BOT_MESSAGE_INFORMATION |

*FIG. 12B*

SceneMessageConfig Table

| messageConfId | messageId | annotationType | annotationValue | entityValue |
|---|---|---|---|---|
| C1 | V1 | Intent | Book_Flight | |
| C2 | V2 | entityType | City | |
| C3 | V3 | tag | Valid_Input | |
| C4 | V3 | entityValue | City | NewYork |
| C5 | V4 | entityType | City | |
| C6 | V5 | tag | Valid_Input | |
| C7 | V5 | entityValue | City | Florida |
| C8 | V6 | entityType | Date | |
| C9 | V7 | tag | Valid_Input | |
| C10 | V7 | entityValue | Date | 2/5/2021 |

DialogNodes

| Type of Node | Description |
|---|---|
| Intent | Book_Flight |
| Entity | Source |
| Entity | Destination |
| Entity | Date |
| Message | |

```
{
    "_id": "dc-1c4762ec-0a9e-51eb-96b2-e92c907095d8",
    "refId": "fef151d1-28f5-57fa-8e1a-28760ea7d099",                          } ───▶ 1310
    "name": "Source",
    "serviceNodeType": "custom",
    "type": "entity",
    "entityType": "City",
    "message": {
        {
            "channel": "default",
            "localeData": {
                "en": {                                                        ───▶ 1320
                    "text": "From%20where",
                    "type": "basic"
                }
            }
        }
    },
    "sampleUserInputs": {
    "localeData": {
            "en": {
            {
                "text": "From NewYork",
            },
            {
                "text": "I would like to travel from SanDiego",                ───▶ 1330
            },
            {
                "text": "check the flights from Austin",
            }
        }
    },
},
```

*FIG. 13*

SYSTEMS AND METHODS OF IMPLEMENTING PLATFORMS FOR BOT INTERFACES WITHIN AN INTELLIGENT DEVELOPMENT PLATFORM

FIELD

The present disclosure relates to the development and design of bot applications and, more particularly, to one or more components, systems and methods of an intelligent development and design platform configured to assist users in the design, development, and deployment of bot applications.

BACKGROUND

A bot is a software application used to conduct an on-line chat conversation via text or text-to-speech. For example, chatbots are used in dialog systems for various purposes including customer service, request routing, or for information gathering. In use, bot applications implement natural language recognition capabilities to discern the intent of what a user is saying in order to respond to inquiries and requests. However, a problem arises in that that most bots try to mimic human interactions, which can frustrate users when a misunderstanding arises.

Visualizing how end-users are expected to interact with the bots is a very essential exercise in building successful bots. This helps in designing engaging conversations as well as simplifies the communication between business users, conversation designers, language experts, and bot developers. But, designing bots comes with many different challenges as compared to the development of traditional websites or apps. For example, current design tools do not allow for the integration of the design and development stages in a fluid manner. These design tools also have difficulty in identifying conversation flow, intents and entities in the conversation, API calls and other intricacies of the conversation well ahead of development.

SUMMARY

In a first aspect of the invention, there is a computer-implemented method for performing the steps/functionality described herein. In another aspect of the invention, there is a computer program product including a computer readable storage medium having program instructions embodied therewith. The program instructions are executable by a computing device to cause the computing device to perform the steps/functionality described herein. In another aspect of the invention, there is system including a processor, a computer readable memory, and a computer readable storage medium. The system includes program instructions to perform the steps/functionality described herein. The program instructions are stored on the computer readable storage medium for execution by the processor via the computer readable memory.

In further aspects of the invention, a computer-implemented method for creating bot applications comprises: creating a scene within a designer view, implemented using a computing system; providing, in a shared database, one or more definitions corresponding to the scene; and creating a dialog task in a developer view using the one or more definitions corresponding to the scene, the dialog task being implemented using the computing system and comprising one or more nodes corresponding to the scene.

In further aspects of the invention, a computer program product comprises a computer readable storage medium having program instructions embodied therewith. The program instructions are executable by a computing device to cause the computing device to: determine when an utterance within a scene is a user utterance or a bot utterance; if the utterance is a bot utterance, determine when the utterance is tagged as a question, information or error message and create a node within a dialog task of a developer view, based on the tag; when the utterance is a user utterance, create an intent node based on the user utterance and, should the intent node already exist for a determined intent, add subsequent nodes determined in the scene to the intent; determine that the user utterance is tagged as a valid input and, when so, determine when the user utterance has an entity annotation; and use the entity annotation to add an entity type to the entity node created for a previous bot utterance.

In further aspects of the invention, a system comprises: a processor, a computer readable memory and a computer readable storage medium associated with a computing device; and a centralized system of the computing device operable to: create a conversation design within a designer view; create bot definition in a developer view; and provide, in a shared database, one or more shared definitions corresponding to the created conversation design and the created definition such that any change in the created conversation design or the created bot definition automatically changes a corresponding bot definition or conversation design, respectively, based on the one or more shared definitions.

BRIEF DESCRIPTION OF THE DRAWINGS

The present invention is described in the detailed description which follows, in reference to the noted plurality of drawings by way of non-limiting examples of exemplary embodiments of the present invention.

FIGS. 6A-6G show different interfaces (e.g., screenshots) of a conversation design in accordance with aspects of the present disclosure.

FIG. 12A illustrates a sample conversation between a bot and a user.

FIG. 12B includes a SceneMessage database entity illustrated in FIG. 11.

FIG. 12C includes a SceneMessageConfig database entity which includes information related to annotations, tags, or other settings related to the messages in FIG. 12A.

FIG. 12D illustrates the types of dialog task nodes required by the bot to automate the conversation illustrated in FIG. 12A.

FIG. 13 illustrates part of a JSON file which is created when a dialog task is exported.

DETAILED DESCRIPTION

Figure 1:
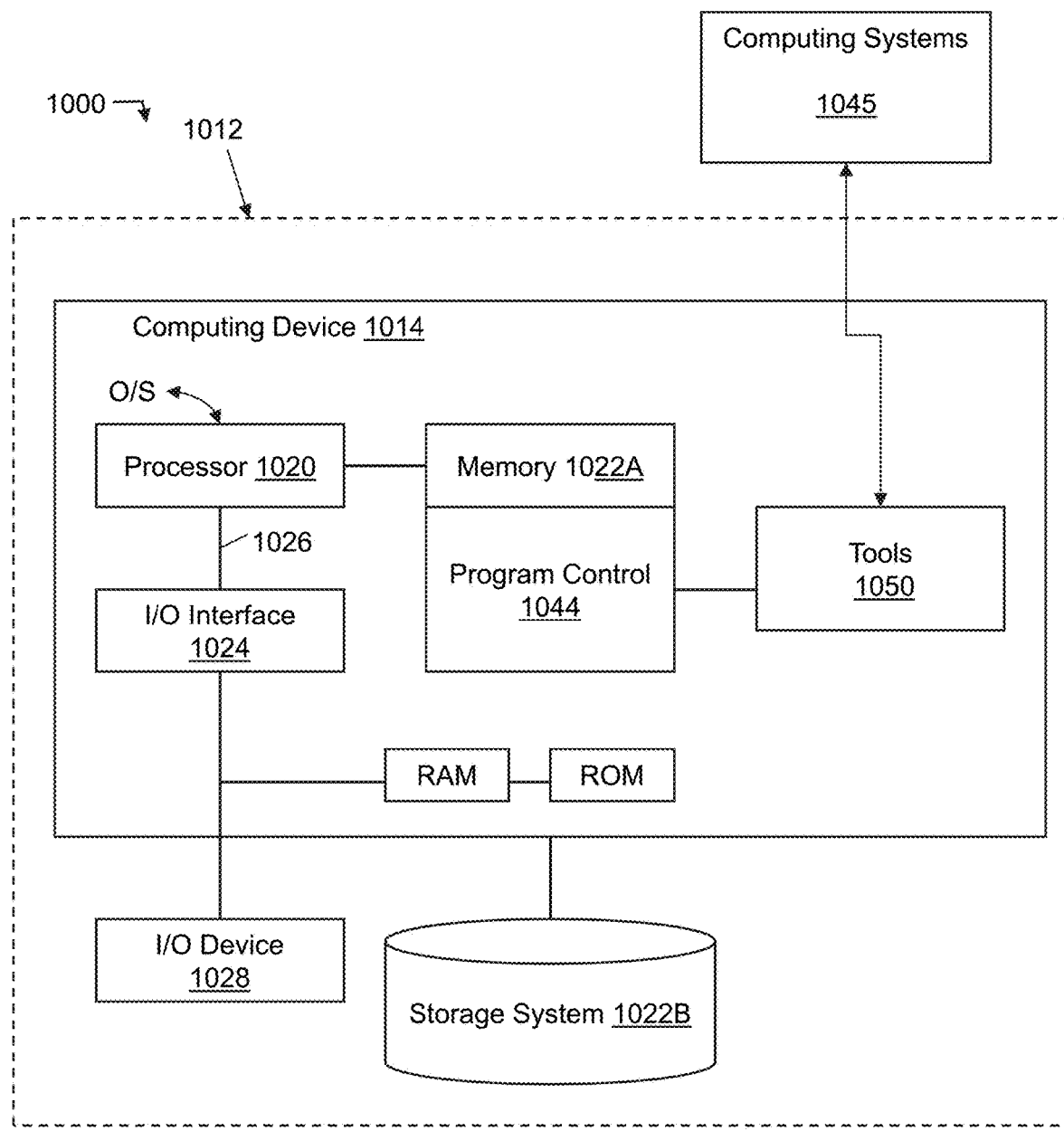
FIG. 1 depicts a computing infrastructure in accordance with aspects of the present disclosure.

The present disclosure relates to the design and development of bot applications and, more particularly, to one or more components, systems and methods of an intelligent design and development platform configured to assist users in the design and deployment of bot applications. In more specific embodiments, the one or more components, systems and methods assist in the design and development of a bot conversation by automatically generating editable dialog tasks (e.g., also known as a bot definition or bot configuration) in a development tool based on scenes (also known as a conversation design) provided within a conversation design (e.g., scenes of a bot conversation designed by a conversation designer). Advantageously, a developer can edit or use the generated dialog task to fine tune the bot functionality.

The intelligent design and development platform is an intuitive conversation design tool that simplifies and streamlines the bot development process. For example, the intelligent design and development platform allows the designer to design various scenes that are representative of the actual end-user conversations with the bot. Scenes can be shared with other teams for collaborative development, and can also be presented as prototypes to the business owners for receiving feedback. The design conversations use simple text messages, carousels (e.g., a pattern used to display multiple items in a horizontally scrollable portion of a graphical user interface (GUI) and lists), with elaborate conversations using linked messages across the multiple paths as a unified flow. It is also possible to create conversations by collaborating with other designers, and share prototypes with stakeholders for reviews and feedback.

In embodiments, the intelligent design and development platform can include a designer view and a developer view. The designer view includes multiple scenes, each of which depicts a conversation as a series of bot and user messages (also referred to as utterances). Bot messages can be defined as plain text messages or using rich templates. For example, the intelligent design and development platform can include the following features:
 (i) the ability to view scenes either in an interactive conversation view or flow view for easy tracking and understanding;
 (ii) the ability to create multiple inter-linked paths in a scene to represent various alternate flows of the conversation;
 (iii) the ability to share scenes with various stakeholders for review, approval, and/or development; and
 (iv) the ability for stakeholders to review and add comments (also referred to as "notes") and tags, with provisions for the developers to add notes to describe or explain a particular path or message.

By way of more specific example, the components, systems and methods described herein can be used by a designer to create multiple bot scenes representative of different conversations between a bot and end user. These different scenes can include complex conversations including different pathways, intents, annotations, decisions, etc. The bot scenes with the related information, e.g., pathways, intents, annotations, decisions, etc., can be automatically converted into one or more nodes within editable dialog tasks in an interface of a development tool of the intelligent design and development platform, using a shared definition, for example, in a database. In embodiments, the shared definition could also be an XML, document, a JSON document, or the like. These editable dialog tasks can then be used by the developer to develop bot applications for many types of different end user applications, e.g., banking applications, weather applications, etc., while bypassing the many complex and cumbersome steps of known development systems. Accordingly, conversation design and editable dialog tasks, which are representative of the different scenes and associated information of the conversation design, can be used by developers, analysts, and/or conversation designers and, in embodiments, shared with clients or other stakeholders for building the specific bot applications in a more efficient manner than known development tools and systems.

System Environment

The components, systems and methods described are referred to hereinafter as "Intelligent Design and Development Platform". The use of "Intelligent Design and Development Platform" should not be considered a limiting feature of the present disclosure. To this end, it should be understood by those of ordinary skill in the art that "Intelligent Design and Development Platform" is merely one of many descriptive terms that can be used to describe the functionality, structures, systems, computer modules, methods and processes described herein.

The Intelligent Design and Development Platform may be embodied as a system, method or computer program product. The Intelligent Design and Development Platform may take the form of a hardware embodiment, a software embodiment or a combination of software and hardware. Furthermore, the Intelligent Design and Development Platform may take the form of a computer program product embodied in any tangible storage medium having computer-usable program code embodied in computer readable storage medium or device. The Intelligent Design and Development Platform operates by processing scenes (which simulate an interaction between a bot and end user) into a flow of editable actions that can be undertaken by the developer.

The computer readable storage medium is not a transitory signal per se, and is any tangible medium that contains and stores the program for use by or in connection with an instruction execution system, apparatus, or device. For example, the computer readable storage medium can comprise electronic, magnetic, optical, electromagnetic, infrared, and/or semiconductor systems and/or devices. More specific examples (a non-exhaustive list) of the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

Moreover, the Intelligent Design and Development Platform can incorporate artificial intelligence (AI) capabilities, e.g., natural language processing (NLP), machine learning processing, and rules engines, with the integration of other functionality to design and develop very granular conversations in bot applications. In addition, the Intelligent Design and Development Platform described herein can be integrated with different application platforms such as development platforms or development tools or components thereof already existing in the marketplace, e.g., Facebook® Messenger™, MicroSoft® Bot Framework™, through plug in architectures.

The computer readable storage medium can be used in the illustrative environment 1000 shown in FIG. 1 for assisting and/or managing the design, development, deployment and/or other enhancements or functionality of bot applications and, more particularly, in the design and development of bot conversations. In embodiments, the computing environment 1000 includes a server 1012 or other computing system, which can be any platform used for the development, design or deployment of the bot conversations. For example, server 1012 can be representative of a development tool or platforms for the development, design and deployment of bot applications. The server 1012 can also be representative of a digital backend as a service (MBaaS), maintained by a service provider. As should be understood by those of ordinary skill in the art, the MBaaS is a model for providing developers with a way to link their applications to backend cloud storage and Application Programming Interfaces (APIs) exposed by backend applications, while providing features such as user management and integration.

Figure 2:
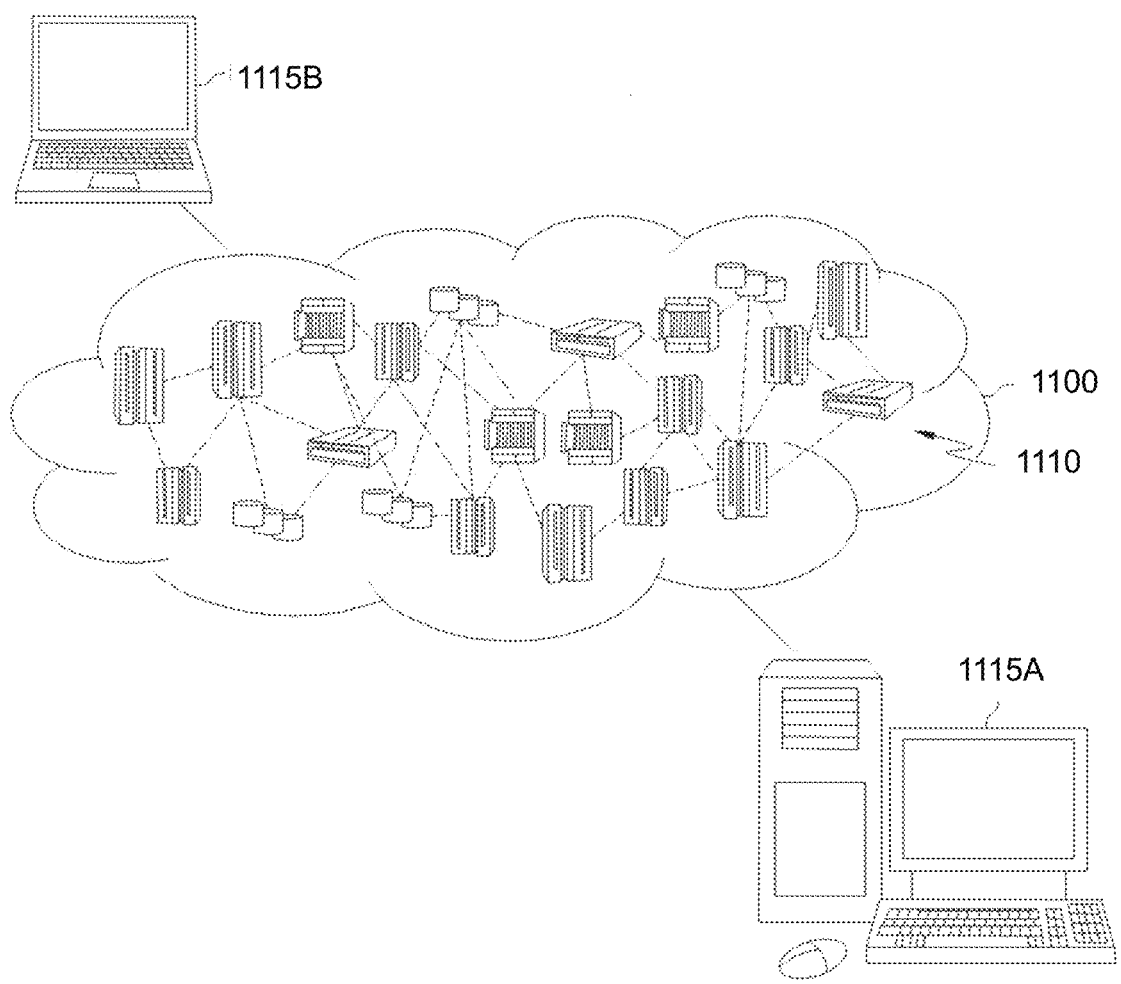
FIG. 2 depicts a cloud computing environment in accordance with aspects of the present disclosure.

The server 1012 and/or processes performed by the server 1012 can be integrated into the networking environment (e.g., cloud environment) such as shown in FIG. 2 or any enterprise management system, development tool or other system also represented in FIG. 2. The server 1012 can also access other external computing systems 1045 to assist in the development of the bot applications and related functionality. For example, the external computing systems 1045 can be external sources which link to the bot conversation, e.g., an external webservice or other application, as examples, by APIs.

Still referring to FIG. 1, the server 1012 includes a computing device 1014, which can be resident on a network infrastructure or computing device. The computing device 1014 includes a processor 1020 (e.g., a central processing unit (CPU)), a memory 1022A, an Input/Output (I/O) interface 1024, and a bus 1026. The bus 1026 provides a communications link between each of the components in the computing device 1014. In addition, the computing device 1014 includes a random access memory (RAM), a read-only memory (ROM), and an operating system (O/S). The computing device 1014 is in communication with the external I/O device/resource 1028 and a storage system 1022B. The I/O device 1028 can comprise any device that enables an individual to interact with the computing device 1014 (e.g., user interface) or any device that enables the computing device 1014 to communicate with one or more other computing devices (e.g., devices 1045, etc.) using any type of communications link.

The processor 1020 executes computer program code (e.g., program control 1044), which can be stored in the memory 1022A and/or storage system 1022B. In embodiments, the program control 1044 of the computing device 1014 of the server 1012 controls the tool(s) 1050, e.g., Intelligent Design and Development Platform, which can be program modules, etc., comprising program code adapted to perform one or more of the processes described herein. The program code can include computer program instructions stored in a computer readable storage medium. The computer program instructions may also be loaded onto the computing device 1014, other programmable data processing apparatus, or other devices to cause a series of operational steps to be performed on the computer. In embodiments, the program code can also be representative of business logic including classification models as described in more detail herein.

Figure 11:
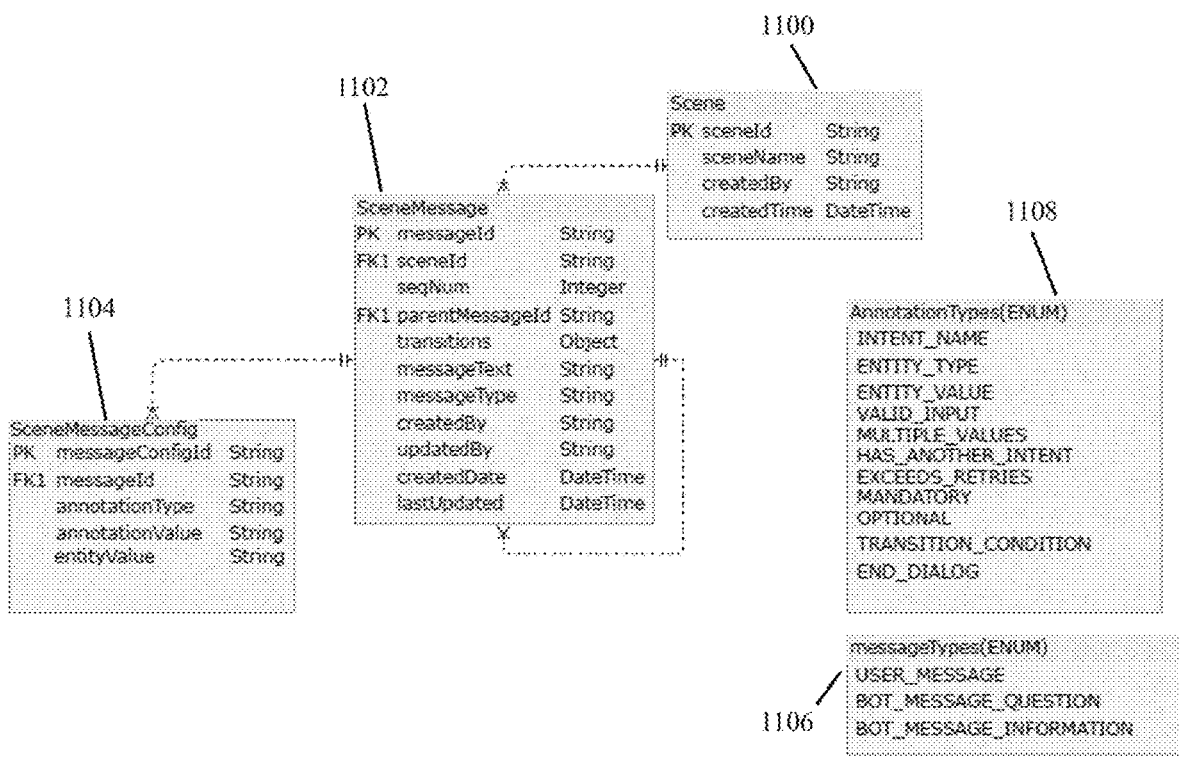
FIG. 11 illustrates a database schema with shared definitions for the designer tool and developer tool in accordance with aspects of the present disclosure.

The Intelligent Design and Development Platform 1050 can be implemented as one or more program code in the program control 1044 stored in memory 1022A as separate or combined modules. Additionally or alternatively, the Intelligent Design and Development Platform 1050 may be implemented as separate dedicated special use processors or a single or several processors to provide the functionality described herein. While executing the computer program code, the processor 1020 can read and/or write data to/from memory 1022A, storage system 1022B, and/or I/O interface 1024. In this manner, the program code executes the processes of the invention. The storage system 1022B can also include shared definitions as shown in FIG. 11, which is accessible by both the designer tool and the developer tool; that is, any changes made in a developer view can be automatically updated in the designer view, and vice versa.

The Intelligent Design and Development Platform 1050 can be a software application or a hardware application or combination of both the software and hardware applications to provide comprehensive facilities for bot application development, e.g., design and development of bot conversations throughout many different application types. The Intelligent Design and Development Platform 1050 can be implemented in combination with an integrated development environment (IDE) for building applications that combines common developer tools into a single graphical user interface (GUI). Moreover, the Intelligent Design and Development Platform 1050 can be a standalone system with a plug-in architecture.

In embodiments, the Intelligent Design and Development Platform 1050 can capture a full fidelity and accurate depiction of scenes of a bot conversation designed by a conversation designer and, in embodiments, automatically convert and/or construct these scenes and related information into editable dialog tasks for use by the developer. The information associated with the scenes not only includes the actual simulated conversation, but may also include comments, annotations, tags, links, intents, different pathways or other instructions, business logic, etc., which are representative of different aspects of the conversation. In embodiments, the intent may refer to the intended meaning of the user message, itself, as provided by the designer or determined by logic, as examples. The editable dialog task will be representative of the bot conversation including the related information. In one example, the editable dialog task may be a bot definition or a part of the bot definition.

By way of illustration, a conversation may be simulated by a conversation designer in a first interface by inputting utterances of both a bot and a user as represented by one or more scenes designed by the conversation designer within a storyboard; that is, the conversation designer creates and simulates a bot conversation between a bot and end user with a conversation, at minimum, being a bot message and a user response to the bot message. A scene may have multiple paths and each path can be an interaction between a bot and a user. The simulated conversation may be designed with different conversation paths diverging from one or more utterances (e.g., a part of the simulated conversation associated with the user or the bot) as denoted by the conversation designer. In embodiments, the utterances can include decisions, e.g., where a user replies to a yes/no question, or be tagged with information such as a question, information or error message. In further embodiments, an application programming interface (API) call can be used to obtain data from an external source. For example, a weather bot may include a service call and a script, where the current temperature at a location needs to be retrieved from a weather API and displayed to the user. The utterances can also be tagged based on an annotation provided by the conversation designer or developer as discussed further herein.

As the conversation is being designed, the conversation can automatically be converted into different nodes within editable dialog tasks within a developer view using a common database schema (e.g., shared definitions) as described with respect to at least FIG. 11 and shown in at least FIGS. 12A-12D. That is, as the conversation is being designed, the Intelligent Design and Development Platform 1050 captures the conversation and related information and automatically creates an editable dialog task and correlates into a logic flow of nodes which tracks the conversation using common database tables. This can be done by way of shared database schema as shown in FIG. 11, for example. In this way, the Intelligent Design and Development Platform 1050 captures the scenes in real-time, which allows for real-time collaboration across the different users. For example, any changes made in a developer view will be automatically updated in the designer view, and vice versa.

The scenes can be converted into the editable dialog tasks comprising one or more nodes, by searching for and automatically correlating utterances, intents, tags, comments, annotations, etc. from the conversation design using a same definition provided within a database as shown, for example, in FIG. 11 and described in more detail at least with reference to FIGS. 12A-12D. In embodiments, the conversion may be performed using predefined rules and associations between the two different types of actions provided by the designer and developer. For example, a menu function can be used to convert designer actions to developer actions. Similar functions can be programmed for converting actions from designer to developer, or certain policies can be appended to the scenes and converted into the editable dialog tasks. The dialog tasks can then be edited by the developer to fine tune the bot functionality by adding, merging or moving nodes, in addition to adding scripts, API calls, business rules, logic, comments, external lines, and other annotations. In this way, the developer can edit the tasks in the dialog task within the development tool to fine tune the bot functionality.

In embodiments, the designer can include many different types of annotations or tags. These annotations or tags can include, e.g., "User says," "Bot says," "beginning of a conversation," "end of a conversation", "small talk," "intent name" (for the part of the conversation), "entity name," "entity type," etc. In embodiments, the entity type may be reflective of a phone number, credit card number, zip code, address, or other required information; whereas, the entity is information required by the bot to fulfill the user intent, e.g., city, phone number, zip code, address, airport, currency, or the like. By way of one specific example, the designer can tag a particular part of a scene as "name tags" e.g., (#Pay bill). These tags can be automatically incorporated into the flow of the developer view which, in turn, can be used by the developer to add to the bot functionality, without the need to consult with the conversation designer or to confer with any outside sources of material.

Moreover, the conversation designer can add annotations or decisions that require certain actions by the developer. The decisions can be user replies to a yes/no question or more complex decisions requiring the developer to link to an external computing systems 1045. In one example, the utterance may be tagged by the conversation designer using a comment or annotation, designating the utterance as requiring a certain "service". This certain service may then be converted to a "service node" by the developer, requiring some action to be taken, e.g., plugging to an external source using an API. Utterances may also be tagged by other types of annotations. In embodiments, the decision can be automatically incorporated into the developer view as a script or service node which, in turn, can be used by the developer to add to the bot functionality. For example, the developer can use service nodes to link and retrieve, via an API, additional information from external sources, e.g., bank account information, weather reports or any host of other services to be displayed to the end user of the bot conversation.

In addition, the designer can add business logic and/or rules, which can be converted into bot action nodes which include, for example, script nodes or service nodes, within the editable dialog tasks. The script nodes, for example, allow the developer to write certain code for executing business logic and/or rules within the editable dialog tasks; whereas, the service nodes may include APIs to obtain information from external sources which can be passed to the script nodes or other nodes for execution. AI and machine learning can acquire insight into programming techniques, as is known in the art, to convert the business logic into usable scripts.

Accordingly, by using the different information within the conversation design, the editable dialog tasks of the Intelligent Design and Development Platform 1050 provides the conversation designer and the bot developer with many distinct and powerful technological features and advantages. These technological features and advantages include, amongst others:

(i) Automatically merging multiple scenes created by the conversation designer into a unified scene;

(ii) Generating timelines based on comments or notations attached to the different parts of the simulated conversation as provided by the conversation designer;

(iii) Allowing the conversation designer to add tags to different utterances within the scenes, e.g., bot conversation, to identify different actions that need to be taken by the developer;

(iv) Automatically identifying and/or linking different paths or nodes within the conversation (as envisioned by the conversation designer) to assist the developer in creating a fluid conversation;

(v) Automatically generating specific editable dialog tasks based on, for example, an intent of the conversation designer;

(vi) Automatically designating different actions into the editable dialog task based on the intent of the conversation designer such as, e.g., comments to hold and/or resume a particular scene, amongst other examples;

(vii) Automatically informing the developer to take certain actions by use of comments or other annotations provided by the designer as part of the simulated conversation and which are automatically tagged to and associated with an editable dialog task associated with the particular part of the simulated conversation;

(viii) Allowing the developer to easily incorporate new nodes, make new links between existing nodes of an existing conversation or simulated conversation, alter nodes, move nodes, and merge nodes, as necessary, to reduce redundancies; and (ix) Allowing the developer to add business logic and/or rules to the editable dialog task.

In this way, the Intelligent Design and Development Platform 1050 can capture multi-role conversations designed by the conversation designer within a storyboard, perform analytics on the multi-role conversations, convert these multi-role conversations into a flow of editable dialog tasks and, in embodiments, allow the developer to use this information in an intuitive manner to develop and enhance the functionality of the bot application. In embodiments, the conversation could have participants such as a human, a chatbot, a universal bot, or the like, with the conversation being between one or more of these participants. The Intelligent Design and Development Platform 1050 will also allow real-time collaboration between developers (or other personas) and conversation designers within an enterprise, while eliminating the cumbersome and costly processes of interpreting, analyzing, and aggregating all of the information provided by a conversation designer.

In embodiments, the conversation designer may design conversations which include multiple actors such as one or more humans, one or more human agents, one or more bots, one or more universal bots, or the like. For example, the conversation designer may design a first conversation between a human and a bot, a second conversation between a human and a human agent, a third conversation between a human, a bot, and a universal bot, a fourth conversation between a human two bots. It may be understood that there may be multiple types of other such combinations of actors in the designed conversations.

Cloud Computing Platform

FIG. 2 shows an exemplary cloud computing environment 1100 which can be used to implement the Intelligent Design and Development Platform 1050. The cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with a service provider. In embodiments, one or more aspects, functions and/or processes described herein may be performed and/or provided via cloud computing environment 1100. It should be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

As shown, cloud computing environment 1100 comprises one or more cloud computing nodes 1110 with which local computing devices are used by the developer and designer. It is understood that the types of computing devices 1115A, 1115B shown in FIG. 2 are intended to be illustrative only and that the cloud computing nodes 1110 and the cloud computing environment 1100 can communicate with any type of computerized device over any type of network and/or network addressable connection (e.g., using a web browser). These local computing devices can include, e.g., desktop computer 1115A, laptop computer 1115B, and/or other computer system. In embodiments, the cloud computing nodes 1110 may communicate with one another. In addition, the cloud computing nodes 1110 may be grouped (not shown) physically or virtually, in one or more networks, such as Private, Community, Public, or Hybrid clouds or a combination thereof. This allows cloud computing environment 1100 to offer infrastructure, platforms and/or software as services for which a cloud consumer does not need to maintain resources on a local computing device.

The cloud computing nodes 1110 can include a variety of hardware and/or software computing resources, such as servers, databases, storage, networks, applications, and platforms as shown, for example, in FIG. 1. The cloud resources 1110 may be on a single network or a distributed network across multiple cloud computing systems and/or individual network enabled computing devices. The cloud computing nodes 1100 may be configured such that cloud resources provide computing resources to client devices through a variety of service models, such as Software as a Service (SaaS), Platforms as a service (PaaS), Infrastructure as a Service (IaaS), and/or any other cloud service models. The cloud computing nodes 1110 may be configured, in some cases, to provide multiple service models to a client device. For example, the cloud computing nodes 1110 can provide both SaaS and IaaS to a client device.

Functional Block Diagram of Intelligent Design and Development Platform

Figure 3:
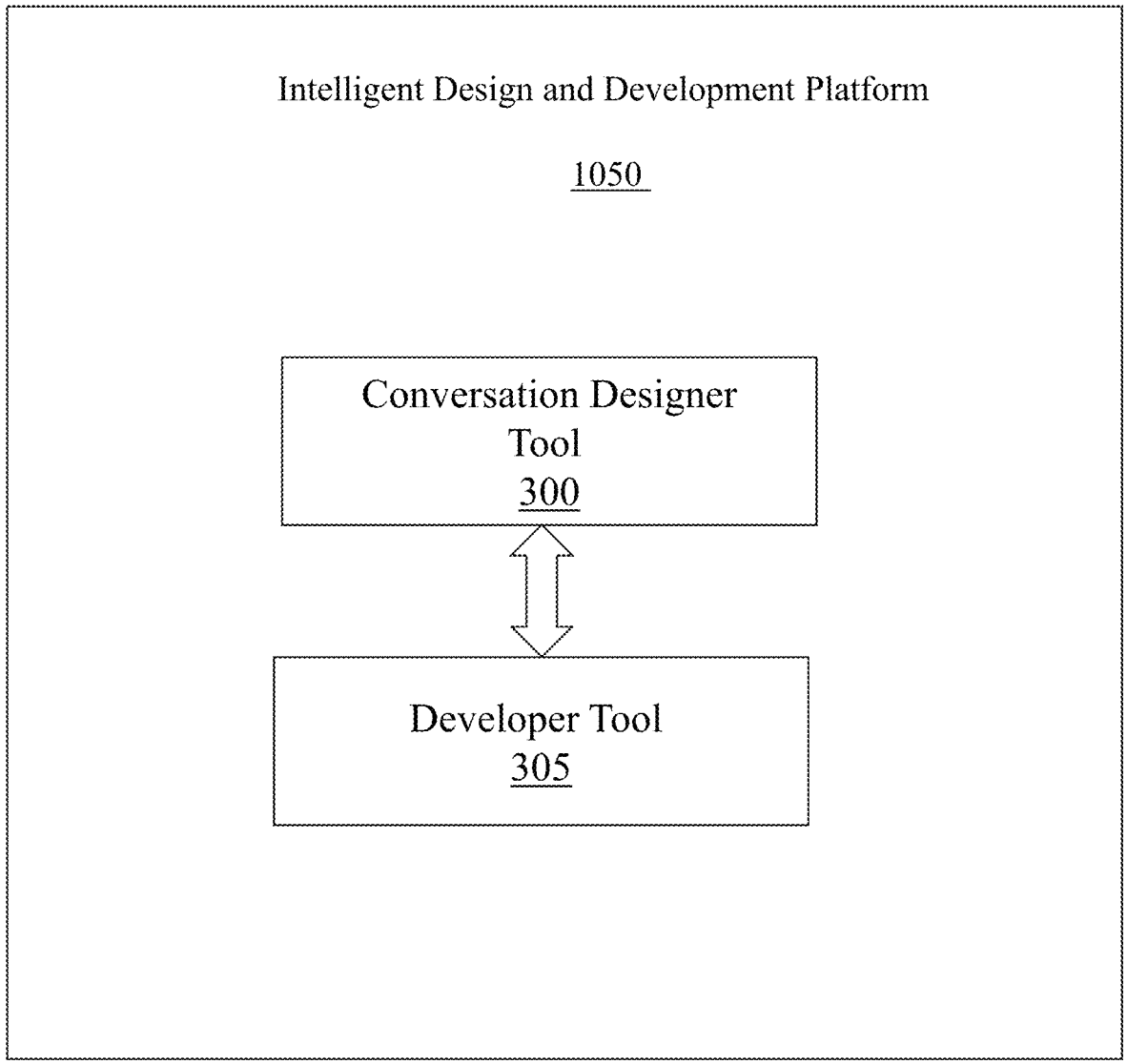
FIG. 3 shows an overview of a functional block diagram of a bot design and development tool in accordance with aspects of the present disclosure.

FIG. 3 shows an overview of a functional block diagram of the Intelligent Design and Development Platform 1050 in accordance with aspects of the present disclosure. The Intelligent Design and Development Platform 1050 includes a Conversation Designer Tool 300 and a Developer Tool 305, which can be implemented with AI and natural language learning components to provide the different functionality as described throughout the disclosure, e.g., business logic and rules to convert, analyze, and/or aggregate, link and merge scenes from a bot conversation into the developer view. The Intelligent Design and Development Platform 1050 will automatically convert the scenes that are specific to the designer within the Conversation Designer Tool 300 to the actions that are specific to the developer within the Developer Tool 305.

Moreover, the Intelligent Design and Development Platform 1050 can be implemented within an integrated development environment (IDE). The IDE provides comprehensive facilities to build the tools of the present disclosure. In embodiments, the IDE maximizes the productivity of the designer and developer by providing tight-knit components with user interfaces thereby improving overall productivity. For example, the IDE provides features for authoring, modifying, compiling, and deploying the Intelligent Design and Development Platform 1050 in accordance with aspects of the present disclosure. Furthermore, the IDE can be graphically based to further assist in the design functionality provided by the Intelligent Design and Development Platform 1050.

In embodiments, the functional blocks described herein can be implemented in the computing environment 1000 of FIG. 1 and/or the exemplary cloud computing environment 1100 of FIG. 2. It should be understood that each block (and/or flowchart and/or swim lane illustration) can be implemented by special purpose hardware-based systems that perform the specified functions or acts or carry out combinations of special purpose hardware and computer instructions. Moreover, the block diagram(s), described herein illustrate the architecture, functionality, and operation of possible implementations of systems, methods, and computer program products according to various embodiments of the present disclosure. In this regard, each block in the block diagram may represent a module, segment, or portion of instructions, which comprises one or more executable instructions for implementing the specified logical function(s).

Conversation Designer Tool 300

In embodiments, the Conversation Designer Tool 300 is an interactive interface (e.g., graphical user interface (GUI)) configured to allow the conversation designer the ability to design different scenes within a storyboard. For example, the Conversation Designer Tool 300 can be used to create a new scene by entering a scene name, description and status. The status can include "In progress," "Completed," or "Approved," as examples. The Conversation Designer Tool 300 can also provide the following capabilities, amongst other capabilities:
  (i) Import an existing scene;
  (ii) Filter scenes based upon their Status, or actors in the scene;
  (iii) Search for a scene by name;
  (iv) Share the scene with other users or teams;
  (v) Duplicate the scene to create a copy;
  (vi) Export the scene;
  (vii) Edit the name, description, and status of the scene; and
  (viii) Delete the scene.

The Conversation Designer Tool 300 can be implemented for any business user view, e.g., client, end users, managers, etc., in the form of one or more scenes representative of a natural language conversation between a bot and an end user, although the one or more scenes may include other types or numbers of actors as already described herein. In the user view, for example, the different scenes can be represented by separate conversation boxes labeled with specific user names, e.g., actor, such as bot and end user. For example, the different actors in a scene can be represented by separate conversation boxes labeled with specific user names, e.g., chat bot, universal bot, human agent, and end user. In this way, the different conversation boxes are associated with a simulation of a natural language conversation (utterances) between, e.g., a bot and end user. Also, as should be understood, the designer will start the project using "non-coded" actions that define the conversation (e.g., a scene) between the bot and the user; whereas, the developer uses the flow of the editable dialog tasks for the actual development phase of the bot application, e.g., writing code to achieve desired functions defined by the designer.

In addition, the interactive interface of the Conversation Designer Tool 300 can visually show different scenes with different paths stemming from one or more utterances as denoted by the designer. For example, the scene may be shown as a linear flow, with branches or with digressions. The branching may include intentionally deviating from the linear flow based on business logic. Digression may occur when the end user enters an utterance which, for example, may result in an alternative or unexpected flow. After branching or digression, the conversation may return or may be merged with the original flow. The digressions may be identified using annotations, tags and/or comments provided by the designer and which are automatically incorporated into a developer view. A digression may include receipt of unexpected entity values or other interruptions (hold and resume settings) as described herein. By way of example, a hold in a current conversation may be provided when the user starts to diverge from the initial intent, for example, by asking a question with a new intent. The bot may hold the initial intent and provide responses corresponding to the new intent. When the conversation with the new intent is completed, the Conversation Designer Tool 300 can bring or resume the conversation to the initial intent.

The Conversation Designer Tool 300 can further include a scene timeline comprising a visual guideline for events (e.g., comments, notes, annotations and/or tags) associated with the scenes as shown in more detail in FIG. 6G. Advantageously, the different information in the timeline can be automatically incorporated into the editable dialog tasks used by the developer. For example, information can be comments, annotations and/or tags, etc., representative of additional information associated with a scene. These comments, annotations and/or tags may include, e.g., reminders, intent names, questions, placeholders, etc., which are visible to the designer and, in embodiments, automatically incorporated into a developer view, i.e., within the editable dialog tasks. FIG. 7C shows one such example of nodes with additional information.

In more specific embodiments, the scene timeline can include graphical or other information to mark crucial states in the conversation using either predefined hashtags, predefined tags or custom tags. These timelines can be used, e.g., selected, by the designer to jump to relevant portions of the conversation by clicking the tag from the timeline. In embodiments, the timeline can include but not limited to, e.g., (i) links between different scenes or designations of different pathways for the conversation, (ii) annotations of different intents such as start a new conversation, e.g., "#Start Intent", resume an old conversation, e.g., #Resume Intent, hold a conversation, e.g., #Hold Intent, etc., (iii) comments associated with any of the scenes, and/or (iv) other tags such as, e.g., "User says", "Bot says", "beginning of a conversation," "end of a conversation", "small talk", "intent name" (for the part of the conversation), "entity name," "entity type," etc. As previously noted, a hold or interruption may be used by the developer to start a new conversation that is different from the initial intent, and then resume the initial conversation when completed with the new conversation.

Moreover, paths may be designated as conditional paths, i.e., optional, linked paths, or reused paths. As should be understood by those of ordinary skill in the art, the designer can define the different paths within the timeline or through other means. For example, a path can differ based upon the user response. The business logic can also decide the number of paths. For example, to continue designing or viewing the scene along a specific path, it is possible to simply select the path either using a previous path (←) or a next path (→) or select the different paths (+).

Developer Tool 305

The Developer Tool 305 is an interactive interface (e.g., graphical user interface (GUI)) configured to adopt the different scenes from the Conversation Designer Tool 300 into a development platform, i.e., developer view. For example, the development platform of the Developer Tool 305 includes a flow of editable dialog tasks that are automatically created from the respective scenes, i.e., conversation boxes of the bot and the user, using a common or a shared definition such as a database table defined for example using the database schema illustrated in FIG. 11.

The shared definition may include intents, entities, annotations, etc. In embodiments, the editable dialog tasks can be created simultaneously as the scene is created in Conversation Designer Tool 300. In this way, any changes in the scene can be automatically reflected as a change in the interactive interface, e.g., editable dialog tasks, and vice versa, of the Developer Tool 305.

In embodiments, the editable dialog tasks can be represented as nodes in a flow diagram as representatively shown in FIGS. 7A-7C and 8-10. The nodes can be automatically formatted into a flow of editable dialog tasks linked through different pathways and which are representative or associated with portions of the scenes in the Conversation Designer Tool 300. The editable dialog tasks also include the information associated with the scenes, e.g., comments, annotations, tags, etc. For example, the Developer Tool 305 is configured to automatically incorporate tags, annotations or comments (generally known as "information") and user/bot utterances from the Conversation Designer Tool 300 into the editable dialog tasks. For example, a bot utterance added in the scene and tagged as a question may be added as a bot prompt in an entity node. This technological feature allows for the automatic incorporation of information retrieved from the Conversation Designer Tool 300 to further assist the developer in adding the required functionality to the bot application. Moreover, the Developer Tool 305 is configured to allow the developer to add scripts and/or business rules to each node, merge nodes together and add other comments, annotations or tags to the conversation. In this way, the editable dialog tasks facilitate the development of the bot application.

Figure 8:
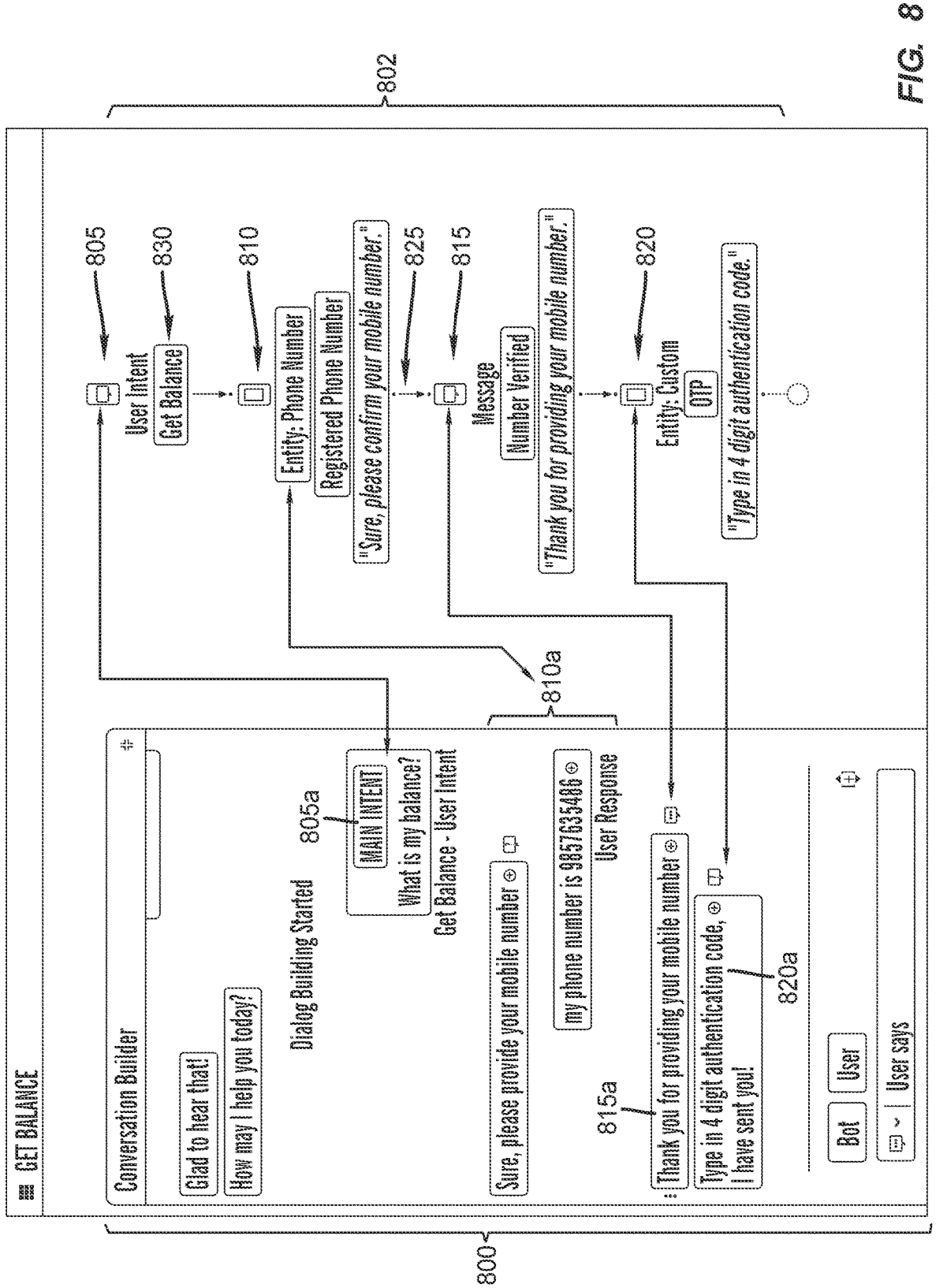
FIG. 8 shows a side-by-side comparison between a designer view and developer view in accordance with aspects of the present disclosure.
Figure 9:
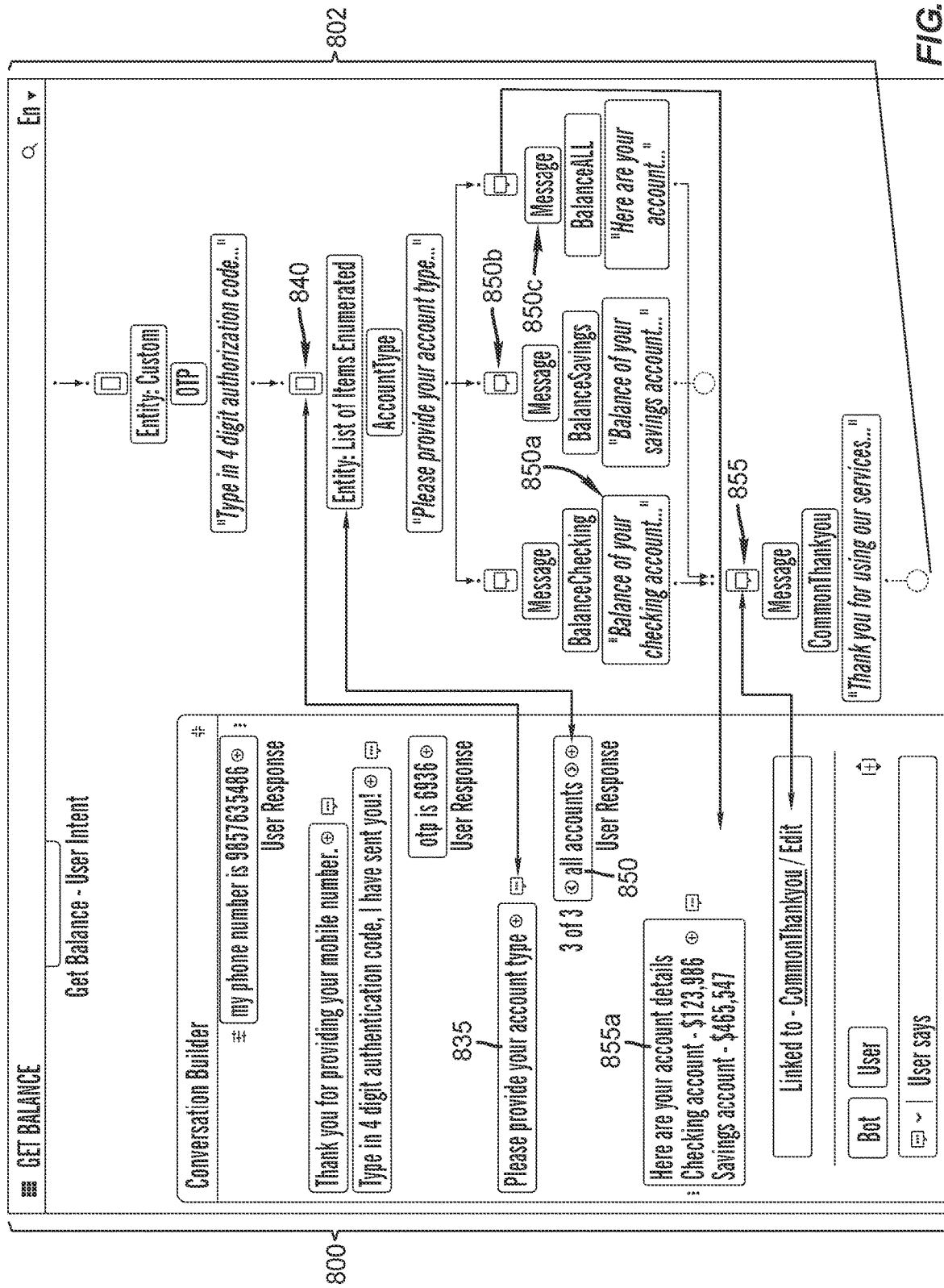
FIG. 9 shows a side-by-side comparison between a designer view and developer view, with a merging and linking of nodes in the developer view in accordance with aspects of the present disclosure.

By way of more specific example, the Developer Tool 305 automatically generates and creates the different nodes with appropriate links from the scenes designed by the conversation designer as shown representatively in FIG. 8 and FIG. 9. That is, the scenes represented as reference numeral 800 will be reflected as dialog tasks or nodes as represented at reference numeral 802. As the scenes are updated or changed, these will be automatically be reflected in the dialog tasks, based on use of a common definition for both the Developer Tool 305 and the Designer Tool 300 as described in detail herein. for example and as described in more detail, entity node 840 in FIG. 9 can be created corresponding to a bot question 835 and a response 850 to the bot question 835 in the scene 800, all of which use a common definition as described in more detail at least with respect to FIGS. 11-12D.

In embodiments, the nodes can include the different comments, annotations and tags for developer access in order to easily integrate such into the functionality of the bot application. In addition, the Developer Tool 305 allows the developer to manipulate any of the nodes, e.g., move, merge, link, reuse, etc., within the interactive interface, for example, by simple drag and drop operations of the different nodes. Linking and merging of nodes is shown representatively in FIG. 9 as an example. The manipulation of the nodes can be based on comments, tags or other annotations provided by the conversation designed within the Conversation Designer Tool 300, and which may be incorporated into the node, itself. The developer also may add new nodes, as necessary, which can be dropped into the flow of nodes and which can be automatically linked to other nodes, thereby creating new conversational pathways as necessary. In this way, should the conversation take different paths, the Developer Tool 305 can automatically map these different paths into the flow of the dialog task. In embodiments, upon dragging and dropping a node into the interface of the developer tool 305, the node may be automatically connected to the appropriate pathway in the dialog task. The appropriate pathway may be determined by the developer tool 305 based on, for example, context information, the node which is dropped, the existing nodes in the dialog task, the paths available in the dialog task to connect the node, or the like.

The Developer Tool 305 also allows the developer to add scripts, business rules, APIs, etc. into or between any of the nodes to add to the functionality of the bot application. In embodiments, for example, the scripts, business rules, etc. can be provided in a script node; whereas, an API call can be provided in a service node. For example, should there be a need to retrieve information from an external source, the Developer Tool 305 will allow the developer to add an API call to connect to an external source, e.g., external database or other computing system, to retrieve such required information. The Developer Tool 305 can also include other functionality such as, e.g., allowing the developer to add comments, tags, annotations, or other information. Accordingly, these added functionalities provide the ability to interact with and optimize the functionality of the bot application.

Intelligent Design and Development Platform and Related Processes

The following figures are flowcharts used to illustrate the architecture, functionality, and operation of possible implementations of systems, methods, and computer program products according to various embodiments of the present disclosure. In this regard, each block in the flowchart may represent a module, segment, or portion of instructions, which comprises one or more executable instructions for implementing the specified logical function(s). In implementations, the functions noted in each step may occur out of the order noted in the figures. For example, two blocks shown in succession may, in fact, be executed substantially concurrently, or the blocks may sometimes be executed in the reverse order, depending upon the functionality involved.

Creating Scenes

Figure 4:
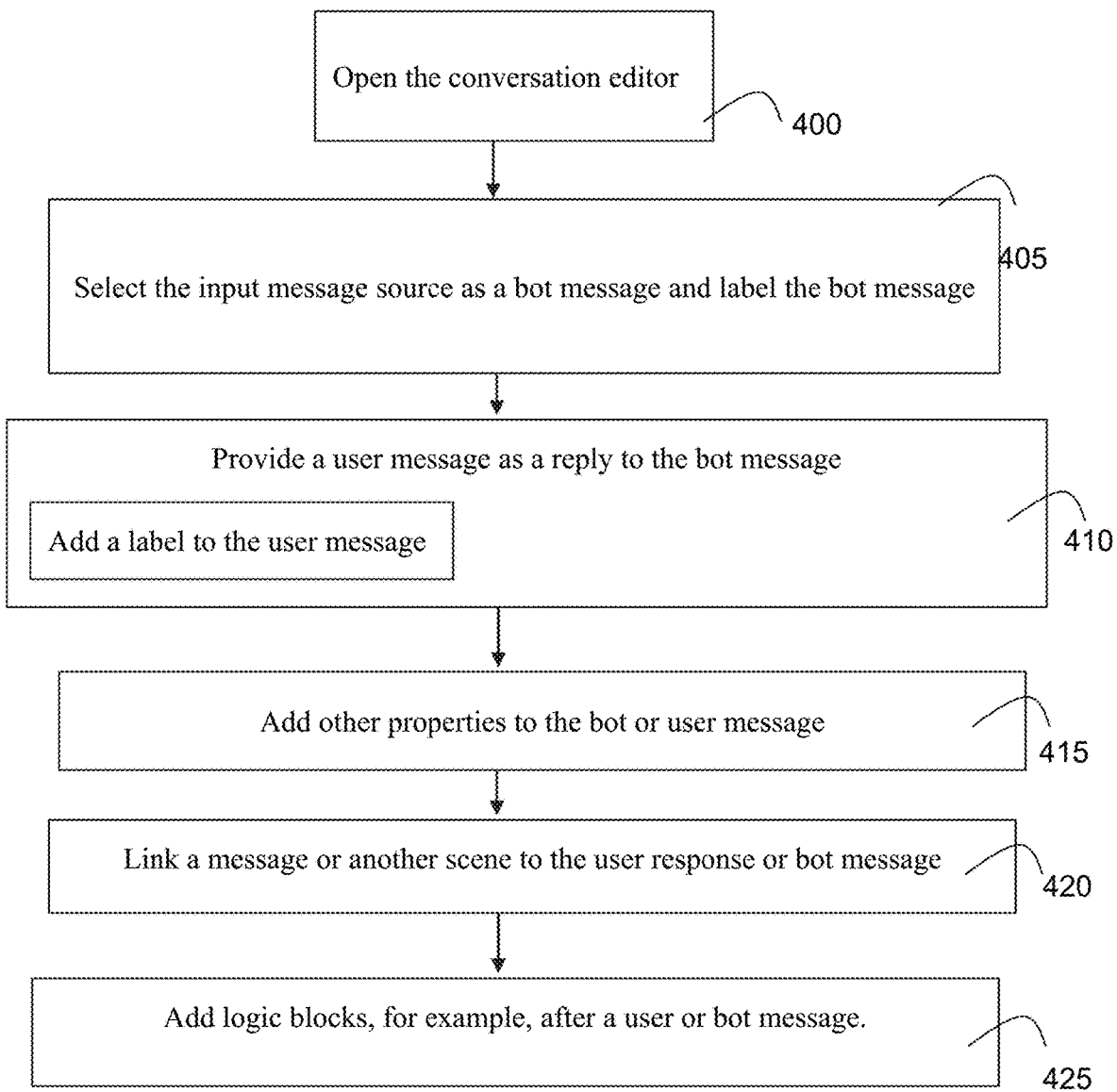
FIG. 4 shows a flow diagram of a conversation design in accordance with aspects of the present disclosure.

FIG. 4 illustrates a flow diagram depicting exemplary steps used to create a conversation design (e.g., scene) in accordance with aspects of the present disclosure. For example, at step 400, the designer opens the conversation editor, e.g., Conversation Designer Tool 300. At step 405, the designer selects one or more input message sources and enters a particular portion of a conversation (e.g., utterances of a bot and a user). In embodiments, one or more input message sources can be tagged as corresponding to different sources depending on the stage of the conversation. For example, the designer can select, e.g., tag, the input message source as a bot message and label the bot message as, e.g., "ask a question" or "present a message," as some illustrative examples which are also shown in the schema of FIG. 11. The designer can then input the bot message into the Conversation Designer Tool 300.

At step 410, the designer provides a user reply to the bot message. In embodiments, the designer can add a label to the user message with any number of tags, comments or annotations. This may include as illustrative, non-limiting examples, the input is valid, the input exceeds retries, the input is associated with another intent, the input includes amended entities or has multiple values as further described with respect to FIG. 5B.

At step 415, the designer can add other properties to the bot message or user reply/message. These other properties can take the form of a tag, annotation or comment, and may include, for example, "hidden", mandatory, optional or configurations such as "number of retries allowed", etc. As should be understood by those of skill in the art the following meanings may be associated with the properties.

(i) Hidden: Entity value may be identified only if it is present in previous user utterances and the end user will not be explicitly prompted.

(ii) Mandatory: The end user must answer the question presented by the bot in order to further the conversation. More specifically, this entity is required, and users must provide a valid entry before proceeding with the dialog flow.

(iii) Optional: The end user may be prompted only once for this entity and the developer tool 305 proceeds with any input provided by the end user.

(iv) "Number of retries allowed": The end user must answer the question properly within a certain number of tries before the conversation is ended or diverted to a different pathway.

At step 420, the designer can link the message (or utterance) to another scene to the user response or bot message. At step 425, the designer can add logic blocks after a user or bot message. In embodiments, the logic blocks may be representative of illustrative processes for the user message.

Converting Scenes to a Flow of Editable Dialog Tasks

Figure 5A:
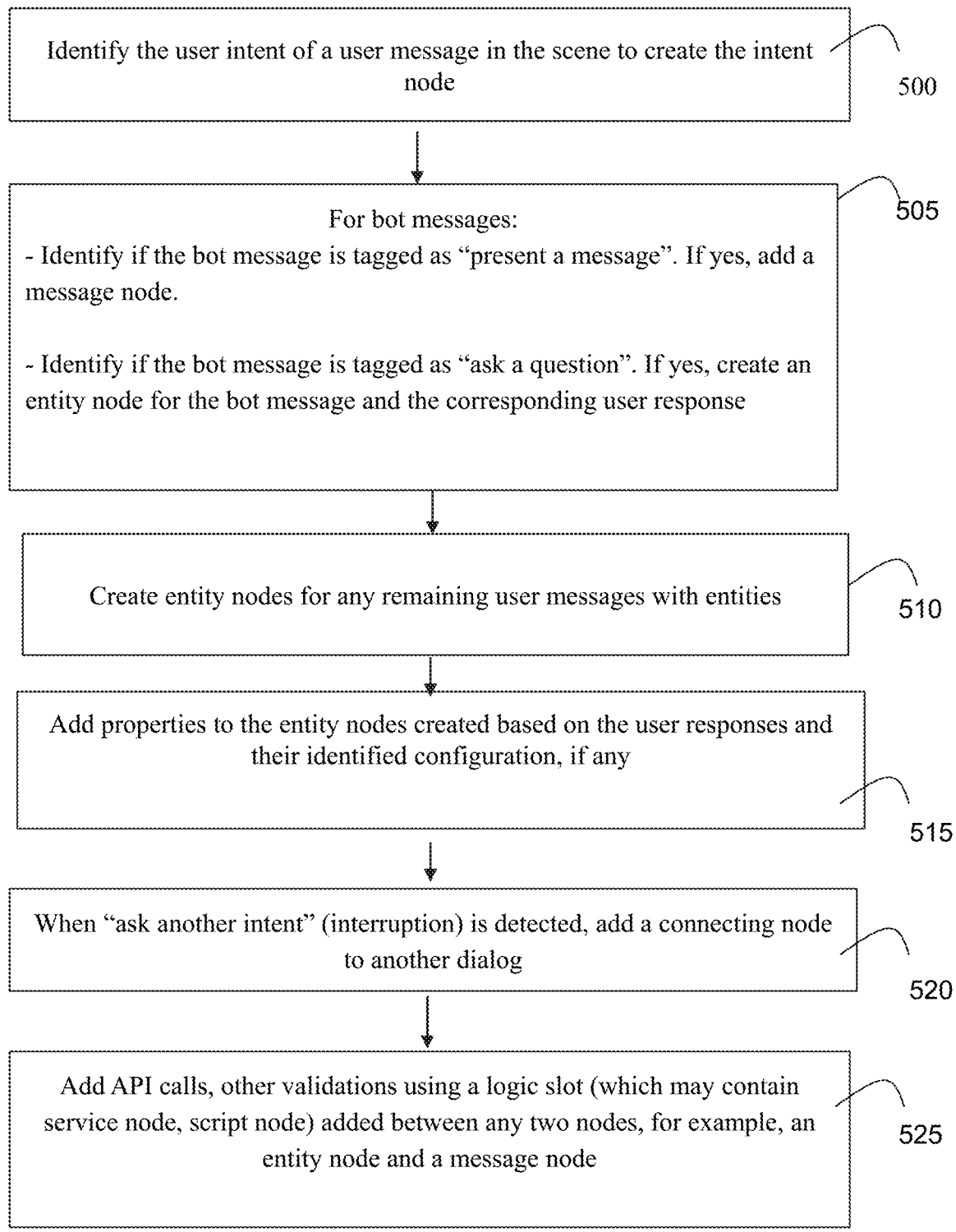
FIG. 5A shows a flow diagram of a developer view created from the conversation design in accordance with aspects of the present disclosure.

FIG. 5A illustrates a flow diagram depicting exemplary steps used to create dialog tasks from the conversation design (e.g., scenes) in accordance with aspects of the present disclosure. For example, as the conversation is created by designer, the editable dialog task can be created simultaneously, for example, in another panel or interactive interface, e.g., Developer Tool 305.

More specifically, at step 500, the development tool uses the intent annotations or identifies the user intent of a user message in the scene to create an intent node within an editable dialog task. In embodiments, different types of nodes are contemplated including, be, e.g., message node, intent node, entity node, script node, service node, bot action node etc. For example, (i) the message node may be used to present a message from the bot to the end user, (ii) an intent node may be associated with identifying a particular intent of the user, (iii) an entity node may be used to gather the required information to fulfill the user intent, e.g., location, date, etc., (iv) a script node includes executable code for executing some required action, a (v) service node includes a requested service, e.g., an API call to retrieve information from an external source, and a (vi) bot action node serves as a placeholder within which other nodes such as the service node, or the script node may added to implement business logic, or data validation.

In step 505, for the bot messages, the development tool identifies the message and its tagged information. For example, the bot message can be identified as tagged as "present message", or "present information". If so, the development tool can then add a new message node in a flow of nodes within the editable dialog task and add the bot message as a bot prompt in the new message node. Moreover, the development tool can identify if the bot message is tagged with other information such as, e.g., "ask a question". If so, the development tool will create an entity node (e.g., in the dialog task) for the bot message and the corresponding user response. This is further detailed with reference to FIG. 8, 9, 11 or 12A-12C as examples. It should be understood that, in embodiments, the Developer Tool 305 is a visual representation rendered based on code executed by the server 1012, and which shares a common definition with the Designer Tool 300.

At step 510, the development tool creates entity nodes for any remaining entities in the user messages and creates a corresponding bubble to add a bot utterance in the scene. For example, the bot utterance is—"How much would you like to transfer" and the user utterance as a response to this bot utterance includes "transfer $500 tomorrow." The development tool may identify that the user utterance includes the entity "tomorrow" which is additional and create an entity node in the dialog task and a corresponding bubble to add a bot utterance in the scene. The development tool may create the entity node based on tags in the scene, by automatically identifying entity types in the scene, by automatically identifying untagged entities in the scene, or the like. At step 515, the development tool can add properties to the created entity nodes based on the user responses and their identified configuration, if any. Such properties could be, for example—mandatory, optional, hidden, or the like. At step 520, the development tool can detect other intents and add connecting nodes to any dialog. For example, the development tool can detect when asked for another intent by the user, interrupt the flow and connect to another node within the conversation associated with the new intent. The development tool can detect when the user asks for another intent based on tags, annotations, or by using machine learning, semantic comparison, or the like.

At step 525, API calls and other validations using business or other logic in a script node or a service node (e.g., a node that includes the API) can be added by the development tool. For example, the development tool can add the API calls between any of the created nodes, e.g., between an entity node and a message node. For example, the logic can be provided within a service node, or can be a script node created by the developer or the development tool.

Moreover, in any of the steps provided herein, any changes in the scene can be reflected as a change in the dialog task and vice versa. For example, as described herein, the development tool continuously monitors the designer tool, performs and analyzes the stream of utterances and associated information to create one or more nodes within the editable dialog tasks. The continuous monitoring can be performed by using AI or machine learning, which can autonomously convert these new actions into the dialog tasks to be completed by the developer.

Referring back to step 505, the development tool may use the tags, annotations, or a classification model to identify if the bot message is a question or information, if the user utterance includes entities, or to analyze other information in the bot messages, or user messages in the scene. If the tags, bot messages or user messages do not include annotations or tags, the development tool may use one or more classification models to classify bot utterances or user utterances added in the scene, to classify entities in the user utterance, or the like. In embodiments, the development tool may use a first classification model to identify if a bot utterance includes a question or information. If the bot utterance includes a question, the development tool may peek into a subsequent utterance to identify if the subsequent utterance includes an entity. Further, the development tool may use a second classification model to identify the entity type. The results of the first classification model and the second classification model may be used to automatically create an entity node in the dialog task and add settings such as entity type in the entity node. Peeking may include, for example, partially analyzing the utterance or analyzing the message to determine a specific outcome such as an entity type as further discussed in more detail at box 560 of FIG. 5B. Peeking may be performed, for example, when the development tool determines that the bot utterance is a question.

An example of the development tool using a first classification model and second classification model (which can be implemented using the same classification engine or AI) is disclosed using a bot-user conversation added below:

Bot: Which city do you want to fly to
User: I want to fly to New York

The development tool may use the first classification model to determine that the bot utterance is a question. Based on this determination, the development tool may peek into the subsequent message and use the second classification model to determine the entity type in the subsequent user message as "City." The development tool may use the determination that the bot utterance is a question to create an entity node in the dialog task and use the determination the entity type is a "City" to configure the entity type in the entity node as "City."

The development tool may also automatically determine if the bot message is a question, or information, types of entities in the user messages, or the like, and suggest the results of the determination to the conversation designer. The development tool may perform this determination upon, for example, a conversation designer adding the bot message or the user message to the scene. These different scenarios, amongst others, are described with respect to FIG. 5B.

Figure 5B:
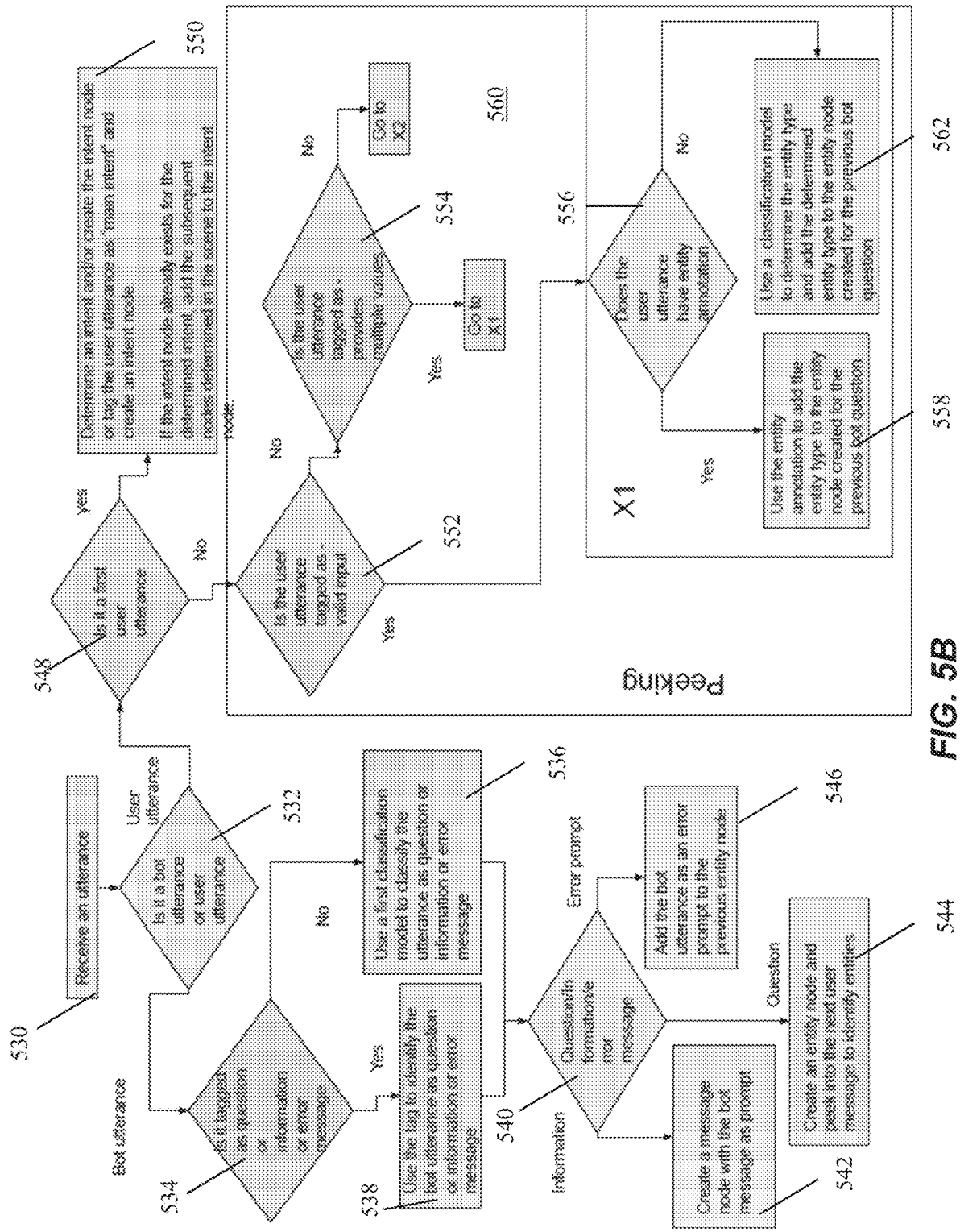
FIG. 5B shows another flow diagram in accordance with aspects of the present disclosure.
Figure 5B:
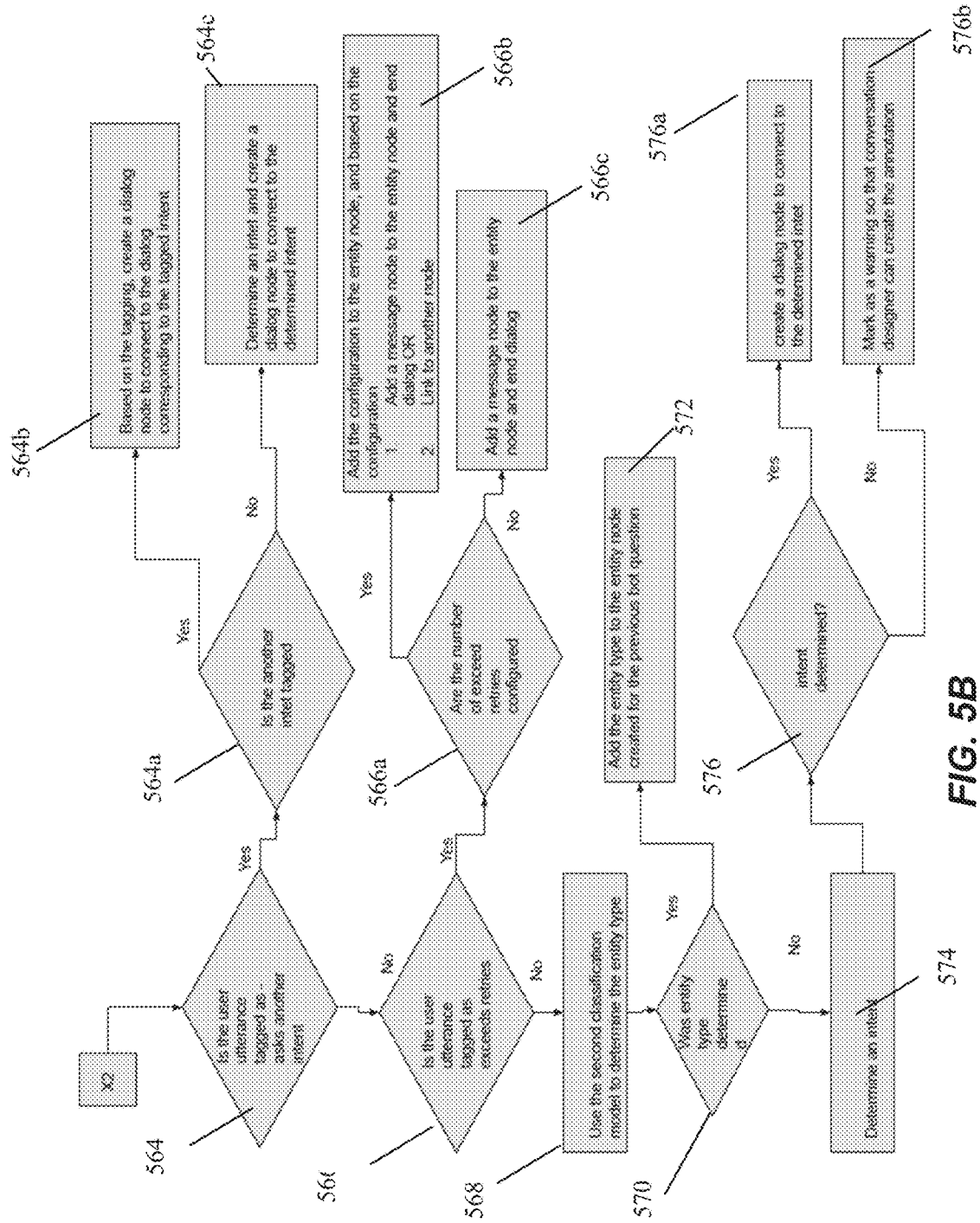

FIG. 5B shows a more detailed flow diagram in accordance with aspects of the present disclosure. At step 530, a conversation designer will add an utterance to the scene, which will be received by the development tool. At step 532, a determination is made as to whether the utterance is from a user or a bot. If the utterance is a bot utterance, at step 534, a determination is made as whether the utterance is tagged as a question, information or error message. In embodiments, the tagging can be provided by the conversation designer.

If there is no tag, the process continues to step 536. In step 536, a classification model may be used to classify the utterance as a question, information or error message. In embodiments, the classification model may be logic or a machine learning based model, which can classify such information. If there is a tag at step 534, at step 538, the tag will be used to identify the bot utterance as a question, information or error message. Steps 536 and 538 both lead to step 540.

At step 540, the flow is divided based on whether the tag is a question, information or error message, e.g., based on steps 536 or 538. If the tag is a message, at step 542, the process creates a message node with the bot message as a prompt. Similarly, if the tag is a question, at step 544, the process creates an entity node and peeks into the next user message to identify an entity. Peeking is described with respect to the steps in box 560. Also, if the tag is an error message, at step 546, the process adds as an error prompt to the previous entity node.

Figure 10:
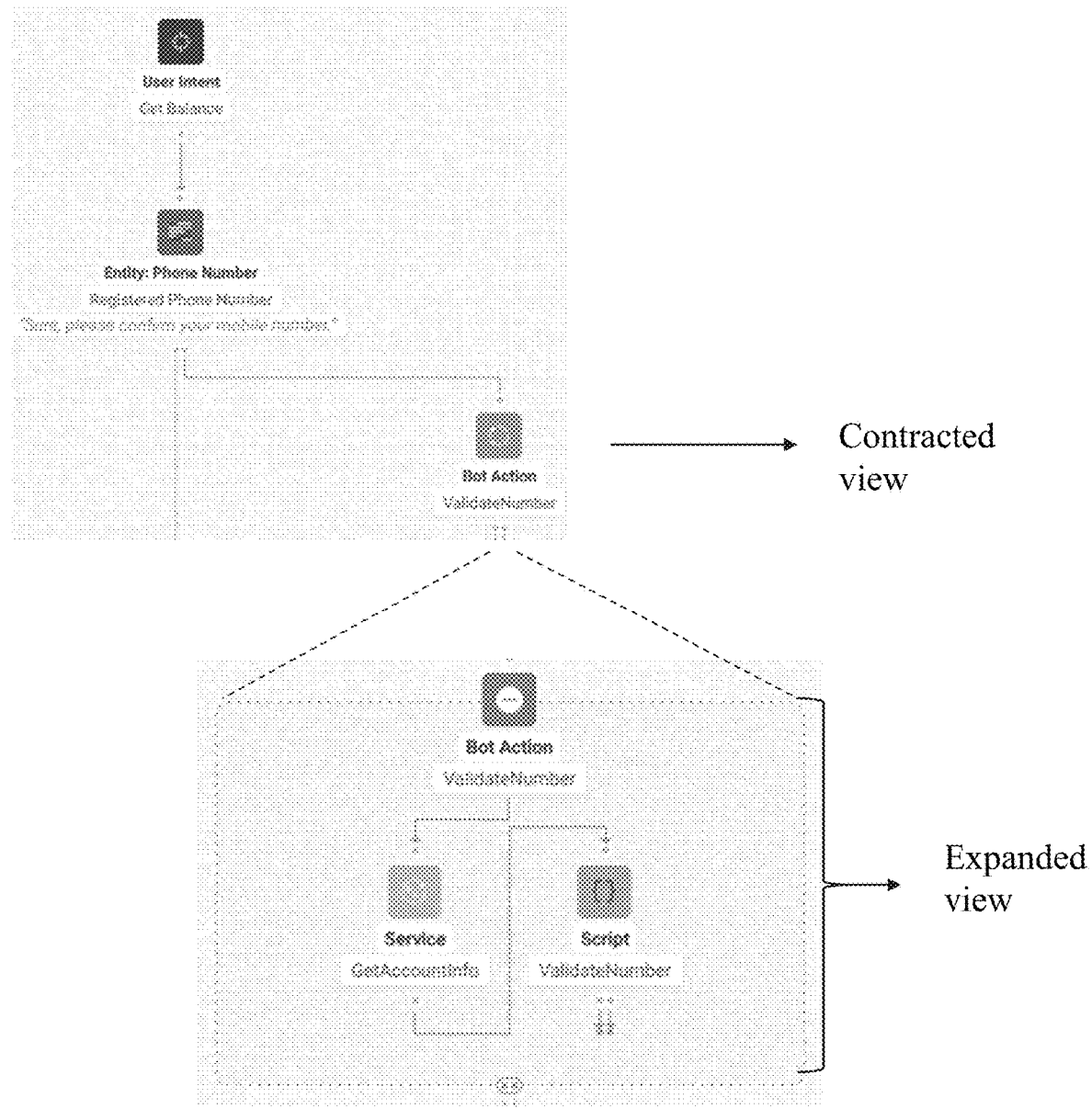
FIG. 10 shows an expanded and contract view of a bot action node in accordance with aspects of the present disclosure.

Referring back to step 532, if the utterance is a user utterance, the process continues to step 548. At step 548, a determination is made as to whether the utterance is a first user utterance. If yes, at step 550, an intent of the first utterance is determined and an intent node is created such as shown in FIG. 10 for example. In embodiments, the process can tag the first user utterance as a main intent and then an intent node may be created based on the tag. If the intent node already exists for the determined intent, the process may proceed to analyzing the subsequent message and can add subsequent nodes determined in the scene to the existing intent node.

In the case the user utterance is not a first user utterance, the flow follows to box 560, e.g., peeking. More specifically, at step 552, a determination is made as to whether the user utterance is tagged as a valid input. If not, at step 554, a determination is made as to whether the tagged user utterance provides multiple values. If not, the process proceeds to X2; whereas, if yes, the process proceeds to box X1. If the user utterance is tagged as a valid, the process also proceeds to box X1.

In box X1, at step 556, a determination is made as to whether the user utterance has an entity annotation. If yes, at step 558, the entity annotation is used to add the entity type to the entity node created for the previous bot question, for example, created at step 544. If not, the process proceeds to step 562 where a second classification model can be used to determine the entity type in the user utterance and add the determined entity type to the entity node created from the previous bot question, for example, created at step 544.

Referring now to the flow starting at box X2, at step 564, a determination is made as to whether the user utterance is tagged as "asks another intent". If yes, at step 564a, a determination is made as to whether the another intent is tagged. If it is tagged, at step 564b, based on the tagging, the process creates a dialog node to connect to another dialog corresponding to the tagged intent. If it is not tagged, the process continues at step 564c, where the process determines another intent and creates a dialog node to connect to another dialog corresponding to the determined intent.

If step 564 is negative, the process continues to step 566. At step 566, a determination is made as to whether the user utterance is tagged as—exceeds a number or retries. If yes, the process continues to step 566a, where a determination is made as to whether the flow behavior upon exceeding the number of retries is configured. If the flow behavior for retries is configured, at step 566b, the configuration is added to the entity node, for example, created at step 544, and based on the configuration, (i) adds a message node to the entity node and ends the dialog or (ii) links to another node or dialog task (another flow in the developer tool). If the flow behavior for retries is not configured, at step 566c, a message node can be added to the entity node, and the dialog is ended.

Should the user utterance not be tagged as exceeding a number of permissible retries at step 566, the process can continue to step 568. At step 568, the second classification model can be used to determine the entity type. At step 570, a determination is made to determine whether there is an entity type determined. If yes, at step 572, the entity type can be added to the entity node created, for example at step 544, for the previous bot question. If the determination is negative, at step 570, the process continues to step 574 to determine an intent from the dialog. At step 576, a determination is made as to whether the user utterance includes an intent. If the an intent is determined, at step 576a, a dialog node is created to connect to the determined intent. If there is no intent, at step 576b, the processes will create a warning for the conversation design to create the annotation. For example, the warning may include text such as "To enable dialog task creation, please provide an annotation to this user utterance."

Exemplary Interfaces of Intelligent Design and Development Platform

FIG. 6A-7F depict exemplary screenshots (e.g., interactive user interfaces) showing the different aspects of the Intelligent Design and Development Platform 1050, e.g., interactive interfaces for the Conversation Designer Tool 300 and the Developer Tool 305. More specifically, the screenshots show the different functionality of the Intelligent Design and Development Platform 1050 in a collaborative, real world application. It should be understood by those of skill in the art, though, that the screenshots are provided for illustrative purposes only and are not to be considered as limiting to the different use cases of the Intelligent Design and Development Platform 1050 as contemplated herein.

Conversation Designer Tool

Figure 6A:
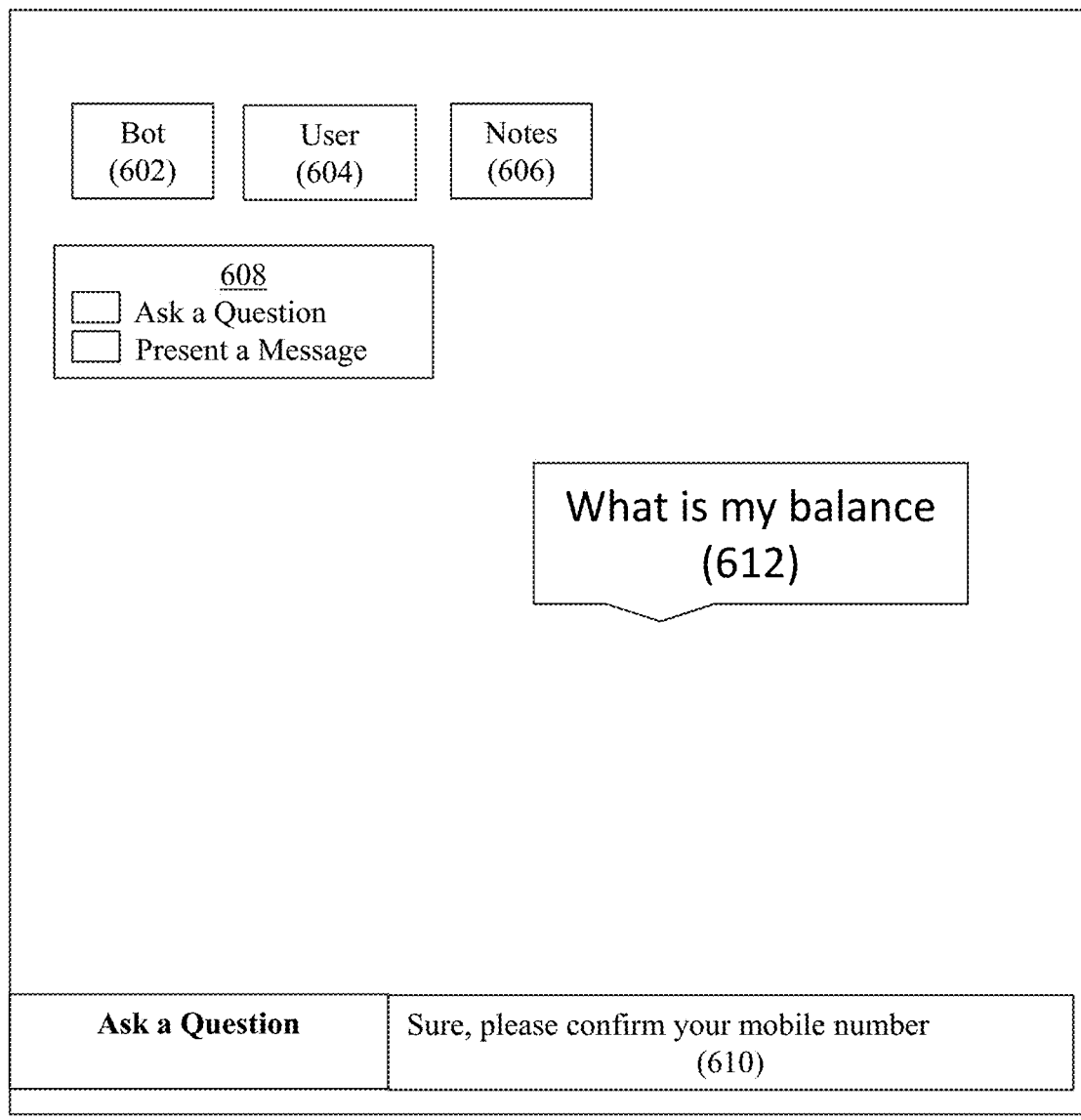

FIGS. 6A-6G depict different interactive interfaces for creating a conversation within the Conversation Designer Tool 300. By way of example, FIG. 6A shows an interactive interface comprising several functionalities that can be performed by the designer, e.g., a selection for a particular user, entry of text and notes, etc. These functionalities can be implemented, for example, by entity type, e.g., selection of a "bot" button 602, a "user" button 604, or a "notes" button 606, in addition to providing a drop down menu 608. In embodiments, the drop down menu 608 can be selected by the designer to either "ask a question" or "present a message", which may be associated with the bot, or "valid input", "exceeds retries", "has another intent", or "has amended entity" which may be associated with the user. In addition, the interactive interface includes a Tillable text box 610, which provides the designer the ability to enter a specific question or present a specific message (e.g., utterances by the user or the bot). The text entered into the fillable text box 610 can be converted to one or more text bubbles 612, representative of a bot interface.

The bot button 602 can be used to design bot messages (e.g., bot utterances). For example, bot messages are messages sent by the bot to users as a greeting, information, answer to a user query, or request for input. These messages can be plain text messages or rich messages using predefined templates such as buttons, list, quick reply, etc. On the other hand, the user button 604 can be used to design messages from users (e.g., user utterances), either requesting information or providing input to a request by the bot. These messages can be defined as plain text messages, for example, in a Banking Bot "I want to transfer money" or "I want to know my account balance"; or as attachments for example in a Banking Bot to upload documents to complete a certain requirement.

In FIG. 6A, the designer selected a particular entity, e.g., "bot" button 602, which provides the designer with the ability to enter a particular utterance associated with the bot. In combination with the selection of the bot button 602, the designer has also selected the "ask a question" functionality in the drop down menu 608. By selecting the "ask a question" functionality (e.g., message type as shown in FIG. 11 and as already described herein) in the drop down menu 608, the bot can now ask a question in response to the text bubble 612, e.g., "what is my balance", which was previously populated by the designer. For example, in response to the user asking "what is my balance", the designer can now enter, e.g., "please confirm your mobile number!" within the fillable text box 610.

In embodiments, the designer can reorder the messages by a simple drag and drop action. For example, by hovering over the message (e.g., text bubble 612), the following options can be provided:

(i) Go to Previous and Next Paths;
(ii) Add a new path;
(iii) Add comments; and
(iv) Delete a message.

Figure 6B:
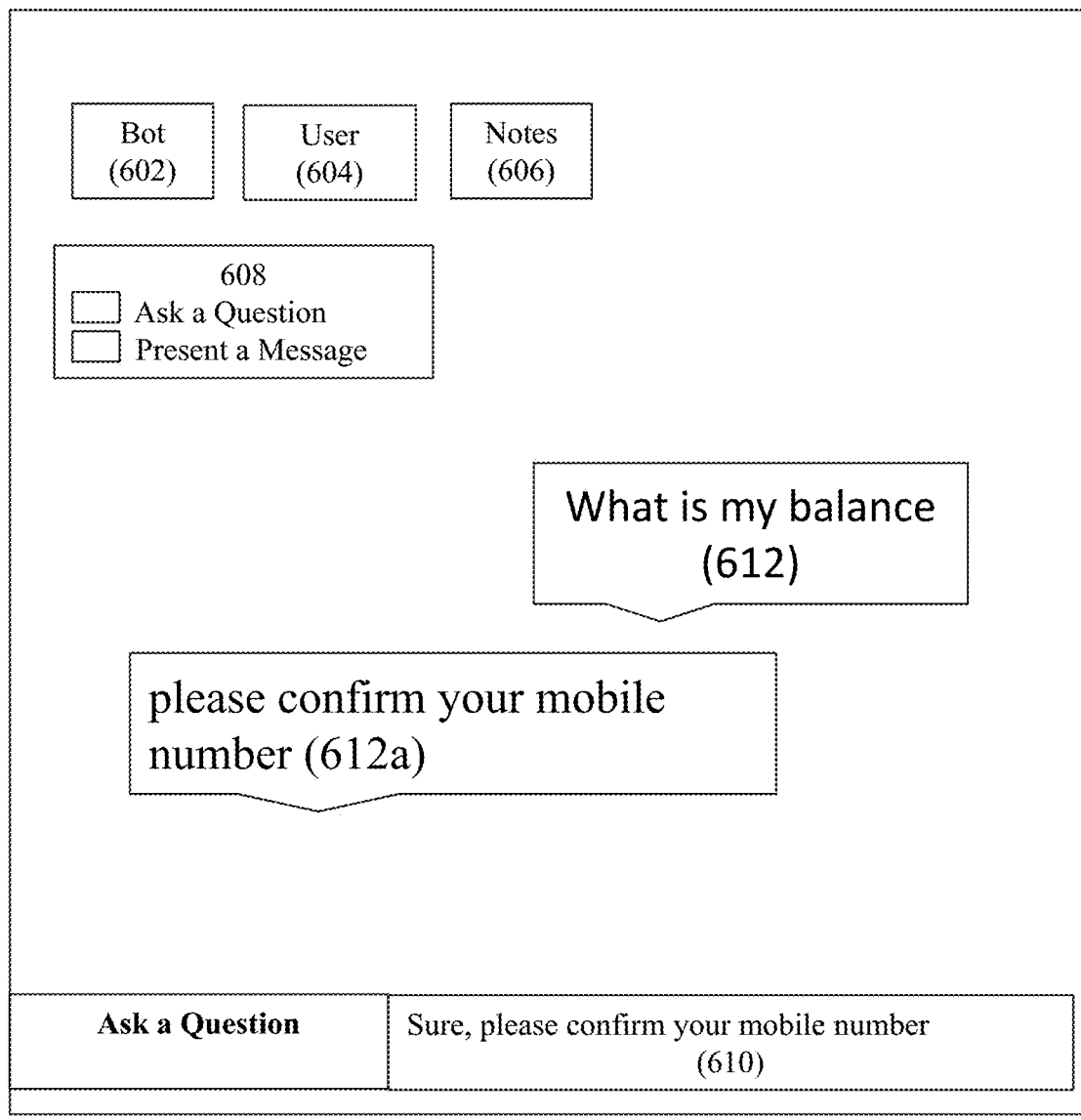

In FIG. 6B, the text within the Tillable text box 610, e.g., "please confirm your mobile numbed", will be automatically populated within text bubble 612a by hitting the "enter" button or other command. This new text bubble 612a is representative of bot message. It should be understood that the text bubbles can be representative of utterances which are converted to different nodes provided in the developer view, and which can be tagged, annotated or provided with comments, etc. for use by the developer. For example, Table 1 below shows an example creation of nodes within the developer tool 305 from different utterances provided within the designer tool 300.

TABLE 1

| Utterances Provided In The Designer Tool | Creation Of Nodes In Developer Tool |
| --- | --- |
| User: what is my balance | intent node |
| Bot: Sure, please enter your mobile number | entity node |
| User: (321) 420-0990 | |
| Bot: Thank you for providing your mobile numb | message node |
| Bot: Type in the 4 digit authentication code that I have sent you | entity node |
| User: 6936 | |
| Bot: Please let me know the account type | entity node |
| User: checking account | |
| Bot: Balance in your checking account is $525.34 | message node |
| Bot: Thank you for using our services. | message node |

In FIG. 6C, the interactive interface allows the designer to provide a label to the user message in drop down menu 614. For example, the label may indicate that the input is, e.g., valid, exceeded retries, asks another intent, asks for amended entities, or provides multiple values. These labels will automatically be incorporated into the developer view and tagged or associated with the message. In this way, the labels can be used by the developer to take certain actions.

Figure 6E:
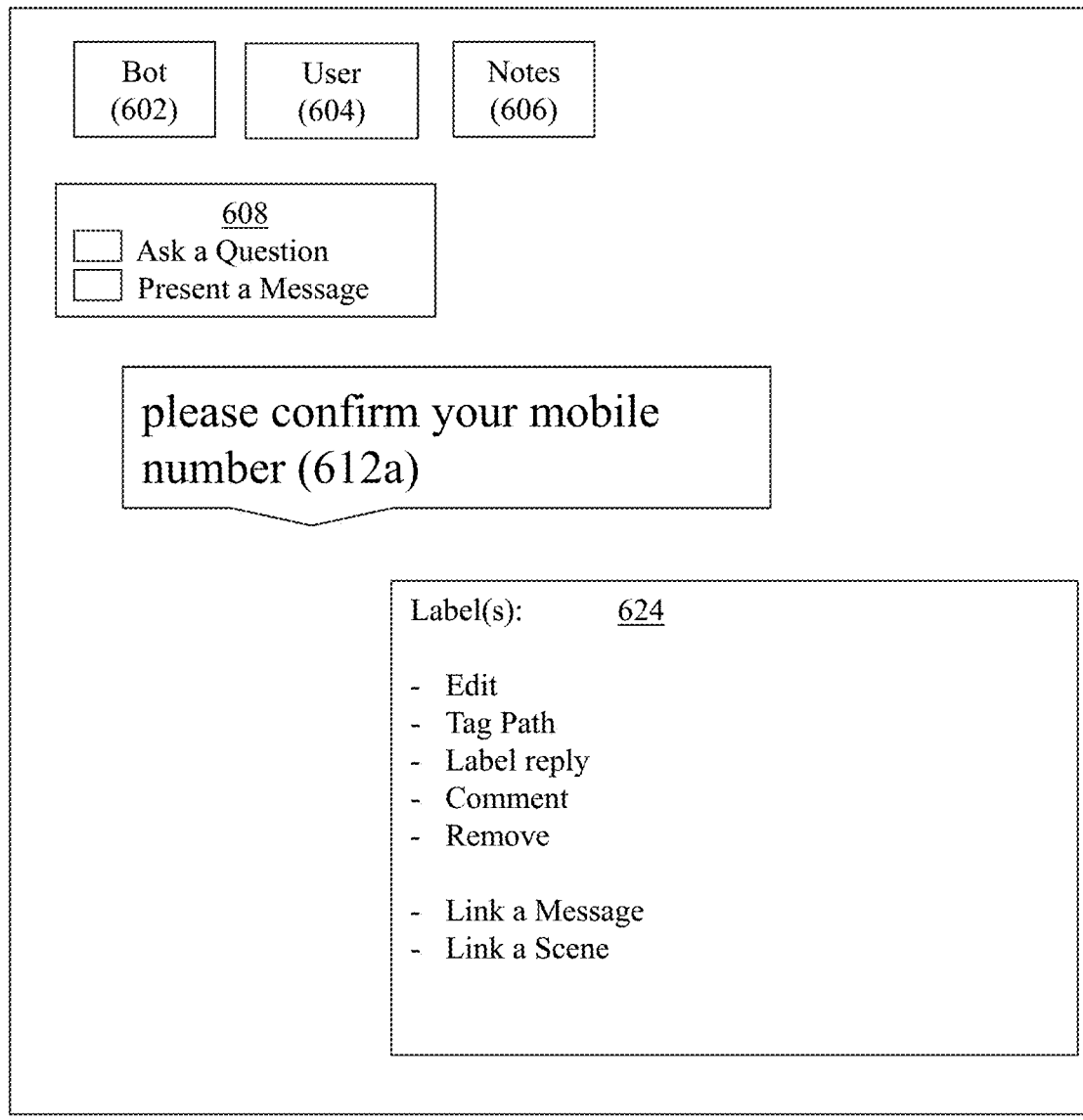

In FIG. 6D, the designer can add other properties to the bot message or user message by selection of task icon 616. In FIG. 6E, the designer can provide additional information for use by the developer. This additional information can be provided in drop down menu 624. For example, the additional information allows the designer to designate messages or scenes to be linked to a particular user response or bot message. This may be a necessary step when multiple scenes need to be linked, amongst other features. The drop down menu 624 provides further options including: edit, tag path, label reply, comment, and remove, as examples, which provide further instruction to the developer. Also, in embodiments, by designating certain links, such links will be automatically generated between the nodes (e.g., editable dialog tasks) in the developer view.

FIG. 6F shows an interactive interface enabled by the conversation designer tool 300, which requests additional actions to be taken by the developer, via logic. For example, the designer can provide additional business logic or rules in natural language text such as a request for API calls and other logic as shown at reference numeral 630. In embodiments, the logic may be added as a "bot action" by selecting, for example, an icon such as (+) provided between utterances in the scene. The bot action can be associated with any number of rules such as: (i) pass the source, destination and the travel dates to a sample API (service node); and (ii) use the source, destination and the travel dates to validate/identify the applicable offers. This additional information will automatically be incorporated into the developer view as an actionable instruction within a particular node. This logic can then be converted into a service node or script node in the developer tool. For example, a script node can include code written by the developer to execute some action requested by the designer; whereas, a service node can include APIs in order to retrieve information from an external source, which can then be passed to the script node or other node for execution.

In embodiments, upon selecting the (+) icon, the designer may be provided with an option to add a bot action. Upon adding bot action in the scene, a bot action node may be added in the editable dialog task. Upon selecting the bot action node, an option may be provided in the editable dialog task to add one or more service nodes, one or more script nodes, one or more logic nodes, or one or more webhooks as part of the bot action node. The developer may configure the nodes which are part of the bot action node to retrieve data, validate data, or the like. The conversation designer may manually add a description, for example as illustrated in 630, to the bot action in the scene. If the developer adds a bot action node to the editable dialog task, a bot action bubble such as 630, may be automatically added to the scene.

FIG. 6G shows a representative scene timeline 630 within the designer tool. In specific embodiments, the timeline 630 can include graphical or other information to mark crucial states in the conversation using either predefined hashtags, pre-defined tags or custom tags. These timelines can be used, e.g., selected, by the designer to annotate the conversation and jump to relevant portions of the conversation by clicking the tag from the timeline. In embodiments, the timeline can include but not limited to, e.g., (i) links between different scenes or designations of different pathways for the conversation, (ii) annotations of different intents such as start a new conversation, e.g., "#Start Intent", resume an old conversation, e.g., #Resume Intent, hold a conversation, e.g., #Hold Intent, etc., (iii) comments associated with any of the scenes, and/or (iv) other tags such as, e.g., "User says", "Bot says", "beginning of a conversation," "end of a conversation", "small talk", "intent name" (for the part of the conversation), "entity name," "entity type," etc.

The tags can be pre-defined tags as depicted by a unique symbol in the timeline indicating their purpose. These pre-defined tags can include as examples:

Start_<intent-name>;
Hold_<intent-name>;
End_<intent-name>;
Resume_<intent-name>; and
Scene Options The Conversation Designer Tool 300 includes additional options. These additional options can be viewed with the scenes, and may include a preview option. The preview option allows the conversation designer to see how the conversation flows on a website. For example, this option will import the scene into a mock website with the chat window. In the preview option, it is possible to play, pause, restart, customize and exit the preview, as examples. In addition, a customize option allows the designer to view the conversation in a widget view. In the widget view it is possible to change the theme and the color scheme or other branding options of any of the particular buttons, text boxes, etc. as would be viewed in the actual bot application, and then import such changes into the scene views.

In addition, the Conversation Designer Tool 300 can include an option that provides the designer with a URL to share the conversation with others. This URL will present the scene preview and allow various stakeholders a glimpse of what to expect, in addition to allowing the stakeholders to provide their feedback. The scene preview URL can be secured with a password.

The following edit options are available by also selecting an icon, e.g., icon 616 of FIG. 6D. These edit options can be made available in both the Conversation Designer Tool 300 and the Developer Tool 300:

(i) Edit the name, description and status of the scene;
(ii) Clone the scene to create a copy;
(iii) Export the scene;
(iv) Import an existing scene; and
(v) Delete the scene.

Developer Tool

FIGS. 7A-7F depict different interactive interfaces for developing the bot application based on the information provided in FIGS. 6A-6G. For example, the different interactive interfaces shown in FIGS. 7A-7F show editable dialog tasks that are representative of the scenes, e.g., dialog between the bot and user as provided by the designer. As shown in these representative figures, the editable dialog tasks flow directly from the scenes created by the designer, and can be automatically linked together and tagged with certain actionable information easily usable by the developer. In addition, the editable dialog tasks can be, e.g., (i) merged together, (ii) placed at other locations with new links automatically being generated, (iii) reused, etc.

Figure 7A:
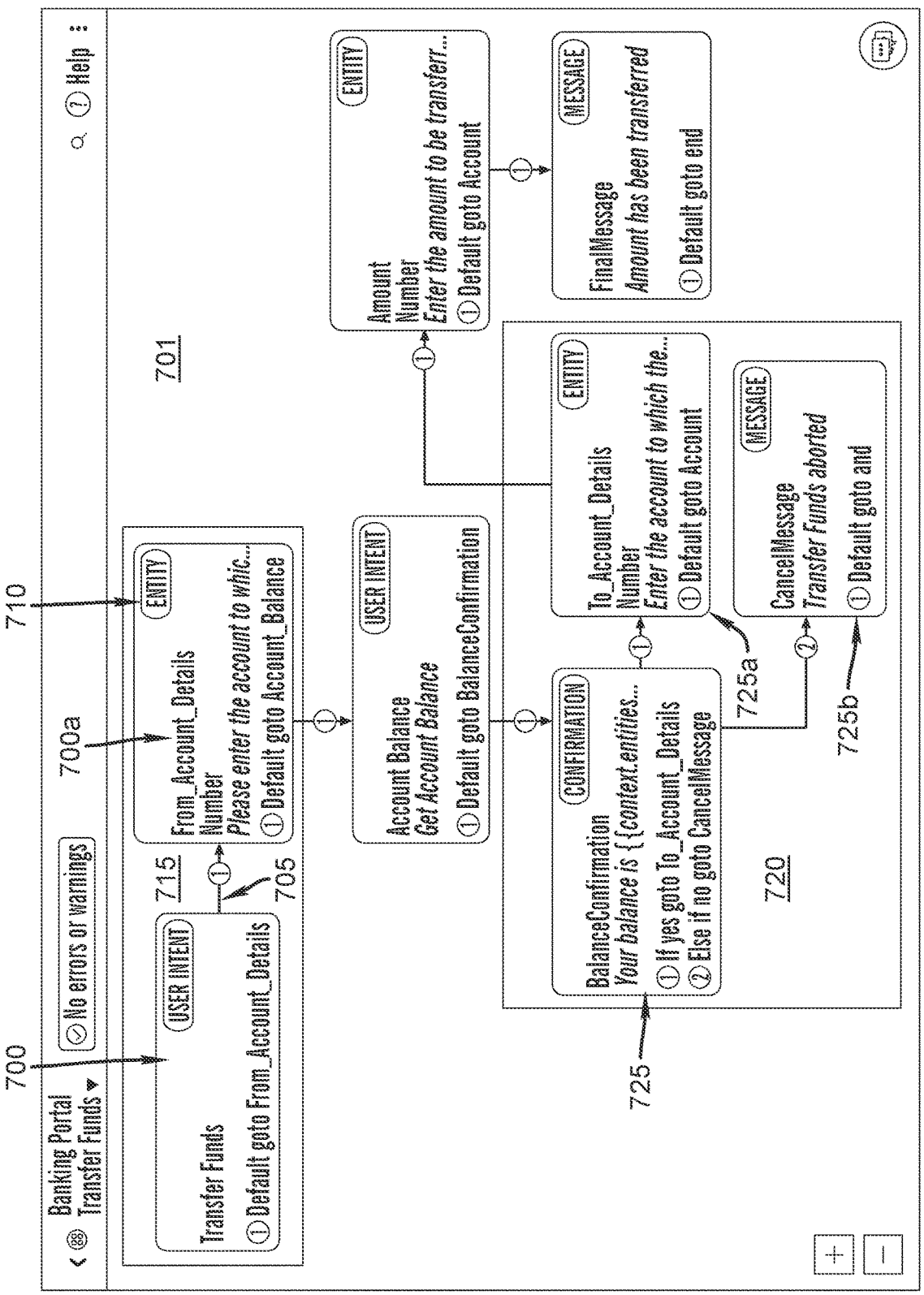
FIGS. 7A-7F show different interfaces (e.g., screenshots) of a developer view in accordance with aspects of the present disclosure.

With this noted, the Intelligent Design and Development Platform 1050 will pass the scenes from a first user, e.g., designer, to a second user, e.g., developer, by automatically converting actions that are specific to the designer to the actions that are specific to the developer. For example, as shown in FIG. 7A, the Intelligent Design and Development Platform 1050 converts designer actions into editable nodes 700 within an editable dialog task 701, each of which may be linked together by links 705 as correlated from the conversation design. In embodiments, the passing of this information and correlation of this information can be performed using a common definition such as, for example, at least one database table defined using a data schema.

In embodiments, each of the nodes 700 within the editable dialog task 701 are editable by the developer. For example, the developer may incorporate notes into the different nodes 700, in addition to tagging the different editable nodes 700 with different intents, properties, labels, etc. The developer can also move the nodes 700 by simple drag and drop operations to make new or different links amongst the nodes 700 within the editable dialog tasks 701. The developer view can also merge nodes 700 within the different editable dialog tasks 701, noting that some of the nodes 700 may be common to one another. In addition, the developer can reuse the editable dialog tasks 701 or nodes 700 in a second set of dialog tasks (not shown), etc.

As further shown in FIG. 7A, the editable dialog tasks 701 include information 710 such as, e.g., entity type, messages from the conversation designer, user intent, or other actionable items needed to be taken by the developer (any of which can be defined by a common data schema as shown in the example of FIG. 11). By way of example, the nodes may include: intent name (for the part of the conversation), "entity name," "entity type," etc. The additional information can be viewed by the developer by simply hovering over the message within the node. This additional information can also be shown, for example, within the timeline of the designer view, tagged directly to the particular node 700 of the editable dialog task 701. In embodiments, the entity name may be converted directly from the bot utterance in the conversation, itself, using AI. For example, the entity name in node 700*a* may be "from_account_details," as determined from the message "please enter the account . . . .".

Moreover, the editable dialog tasks 701 can include the conversation messages, themselves, in addition to other notations. For example, the node 700*a* can include the message "Please enter the account to which you want to see your balance," with the annotation of "From_Account_Details_Number". In embodiments, any of the annotations, e.g., "From_Account_Details_Number", can be automatically populated within the node 700*a* using AI, as an example, based on the context of the message, itself. In embodiments, the annotation may be automatically performed upon receiving an input.

FIG. 7A further shows that the editable dialog tasks 701 may have a linear flow or digressions. The digressions may be identified based on the annotations. The linear flow is shown representatively in box 715 between two nodes 700, 700*a*; whereas, the digression is shown representatively in box 720 between nodes 725, 725*a*, 725*b*. The digressions can be a decision point, as labeled "1" and "2" within the node 725. It should be understood that each of the nodes are editable and that the editable dialogue tasks 701 may comprise one or more nodes.

Figure 7B:
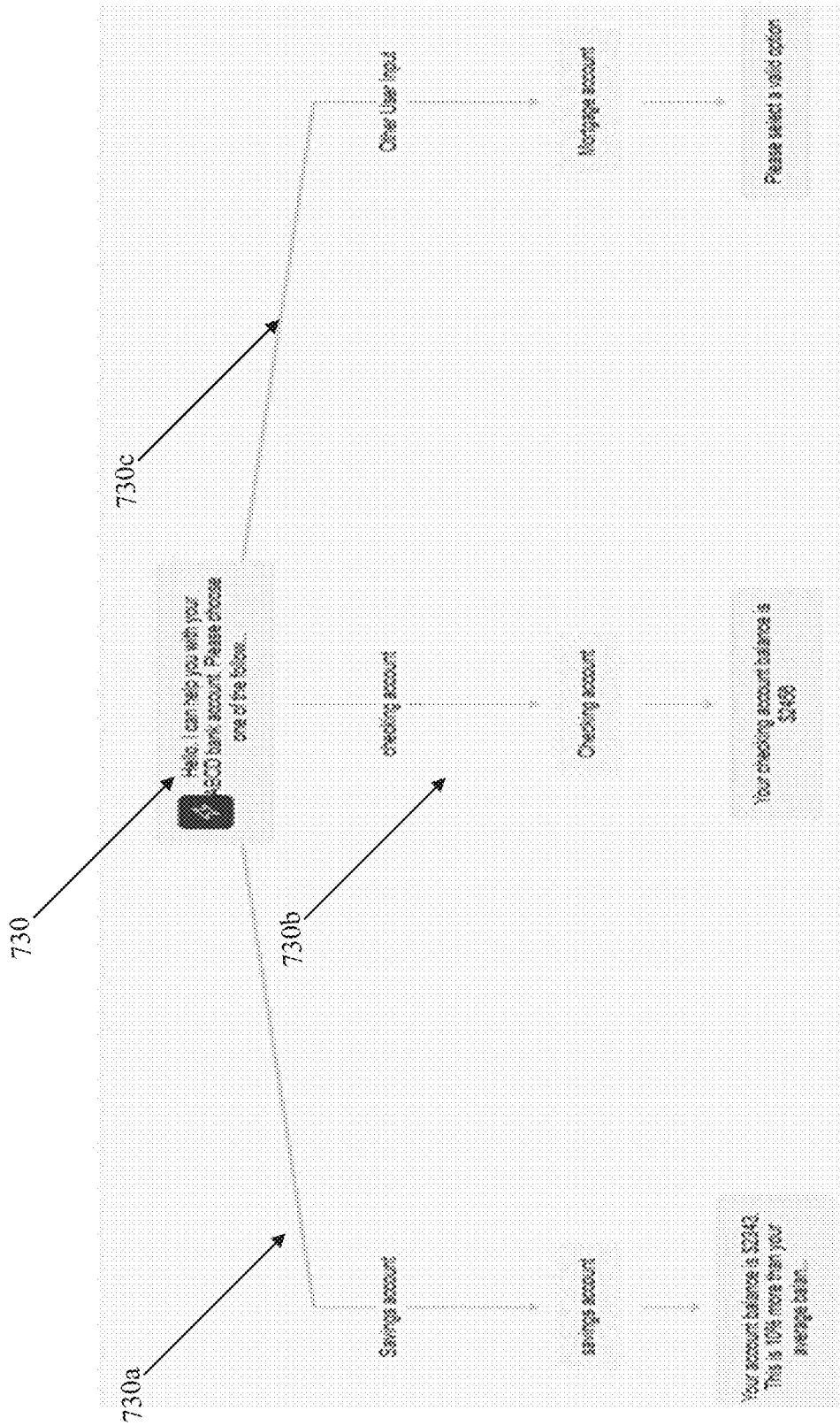
Figure 7C:
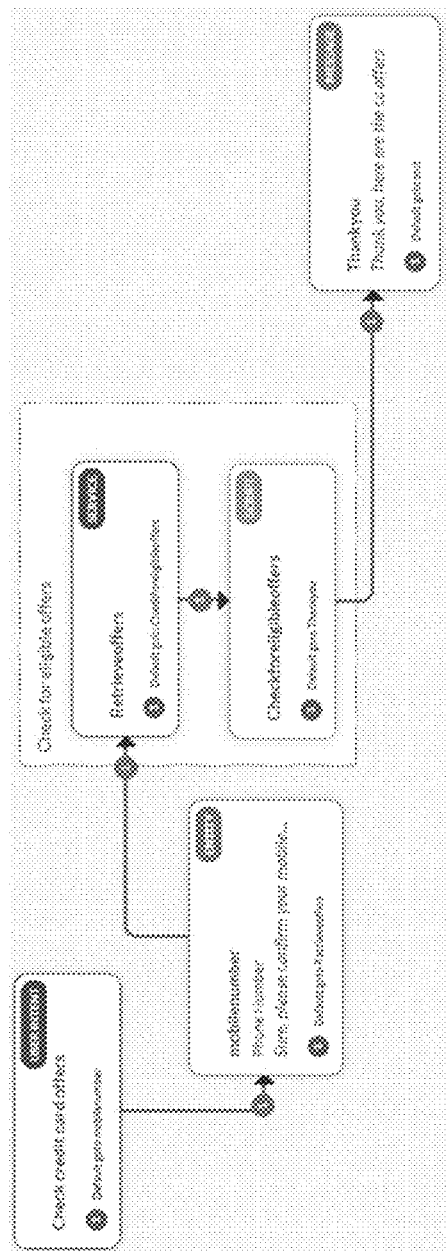

FIG. 7B representatively shows automatic merging of multiple nodes within the conversational flow. It should be understood that the merging function saves a considerable amount of time as it is no longer required to go through a same scene multiple times when, for example, an invalid response is provided by the user or when two or more responses are contemplated. For example, the conversation designer can identify the points in a scene that may merge with other scenes, in which case the Intelligent Design and Development Platform 1050 can merge the common scene into a single node 730 in the developer view. More specifically, as shown in FIG. 7B, the editable node 730 may be common to each of the tasks in nodes 730*a*, 730*b* and 730*c*, in which case it is only necessary to provide the node 730 one time, and then link the different nodes 730*a*, 730*b* and 730*c* to the node 730 within an editable dialog task.

In this case, for example, the conversation designer created three separating scenes starting with "Hello, I can help you with our ABC bank account. Please choose one of the following: savings account or checking account." The additional scenes include the user selecting savings account or checking account; however, in some instances, the designer may create a third scene in which the user enters "mortgage account". In this latter scenario, the conversation design may tag such response as an invalid response. These separate scenes are then correlated into the flow of FIG. 7B, where the node 730 is the common task, e.g., "Hello, I can help you with our BSC bank account. Please choose one of the following: savings account or checking account," and the tasks of nodes 730*a*, 730*b* and 730*c* are associated with "savings account", "checking account," and "mortgage account," respectively linked to the common task 730. In this way, there is no need to have task of node 730 repeating three times, as it is comment to each of the tasks of nodes 730*a*, 730*b* and 730*c*.

The developer view may also add editable tasks associated with API calls, other validations using a logic slot (which may contain service node, script node) added between any two nodes, for example, an entity node and a message node. By way of illustrative example, the conversation designer may have included the following logic: "[Logic: Pass the phone number to API1, retrieve Credit cards and their offers from the API1. Check the offers applicable to this phone number based on the area code]."

This logic can be passed directly into the developer view as editable dialog texts (e.g., service and script nodes) as shown in FIG. 7C.

Figure 7D:
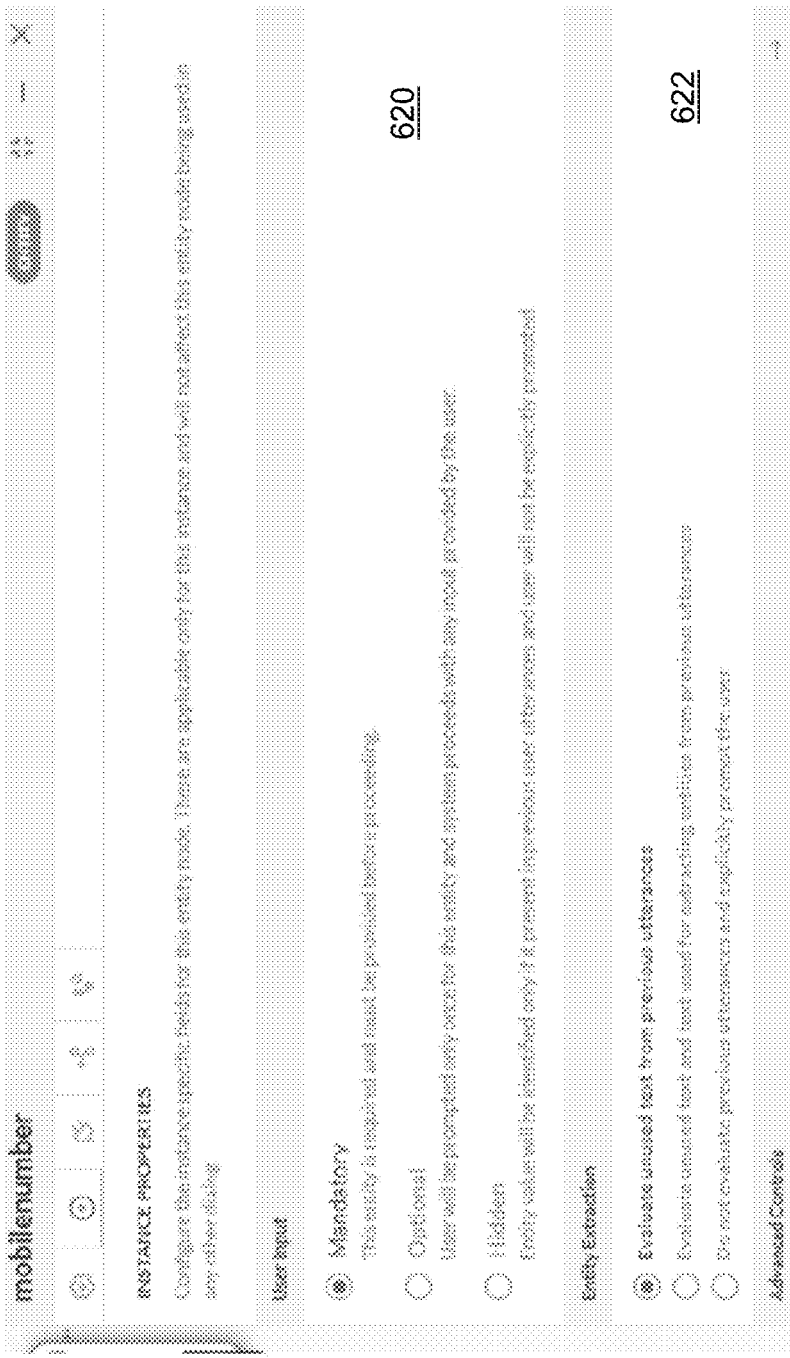

FIG. 7D further shows selectable entity extractions 622 that can be used by a developer within the developer tool. The selectable entity extractions 622 may include, e.g., "Evaluate unused text from previous utterances," "Evaluate unused text and text used for extracting entities from previous utterances," and "Do not evaluate previous utterances and explicitly prompt the user." In embodiments, the selectable entity extractions 622 can be used for additional training in AI processes. These properties will be automatically incorporated into the nodes (e.g., within the editable dialog tasks) of the developer view based on the annotations in the conversation designer to provide actionable instructions to the developer.

Figure 7E:
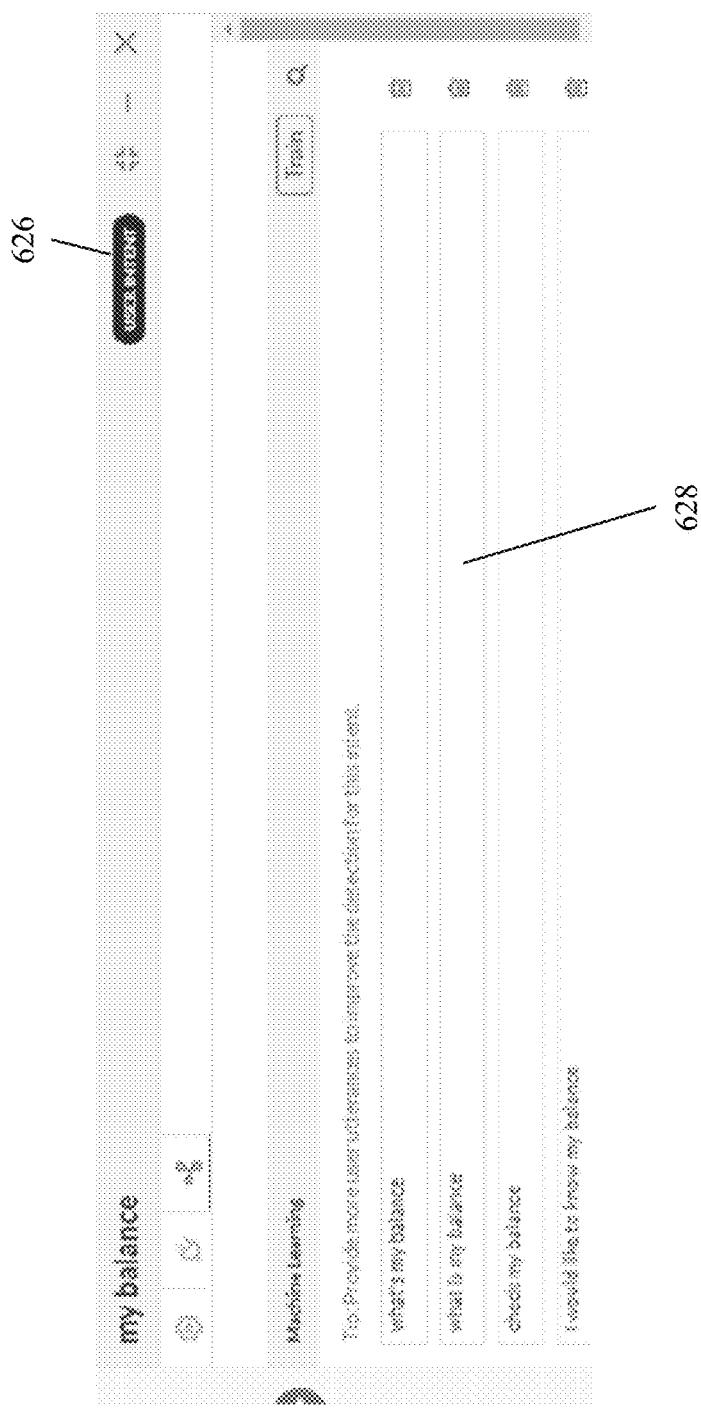

Moreover, in FIG. 7E, the developer interface can identify the user intent of a user message in the scene which is then used to create the intent node by selection of button 626. For example, from the user message "what's my balance", the logic can identify that the user's intent is to check a banking balance. This can be accomplished through training modules of known AI platforms as represented by reference numeral 628. For example, different utterances can be provided to the training module 626 to determine a user's intent. These utterances can be, e.g., "what's my balance," "what is my balance," "check my balance," and "I would like to know my balance," each of which may be used to identify the request by the user. In embodiments, the first user utterance added by the conversation designer may be considered by the development platform as including the user intent, although the other user utterances may be considered as including the user intent in other configurations.

Figure 7F:
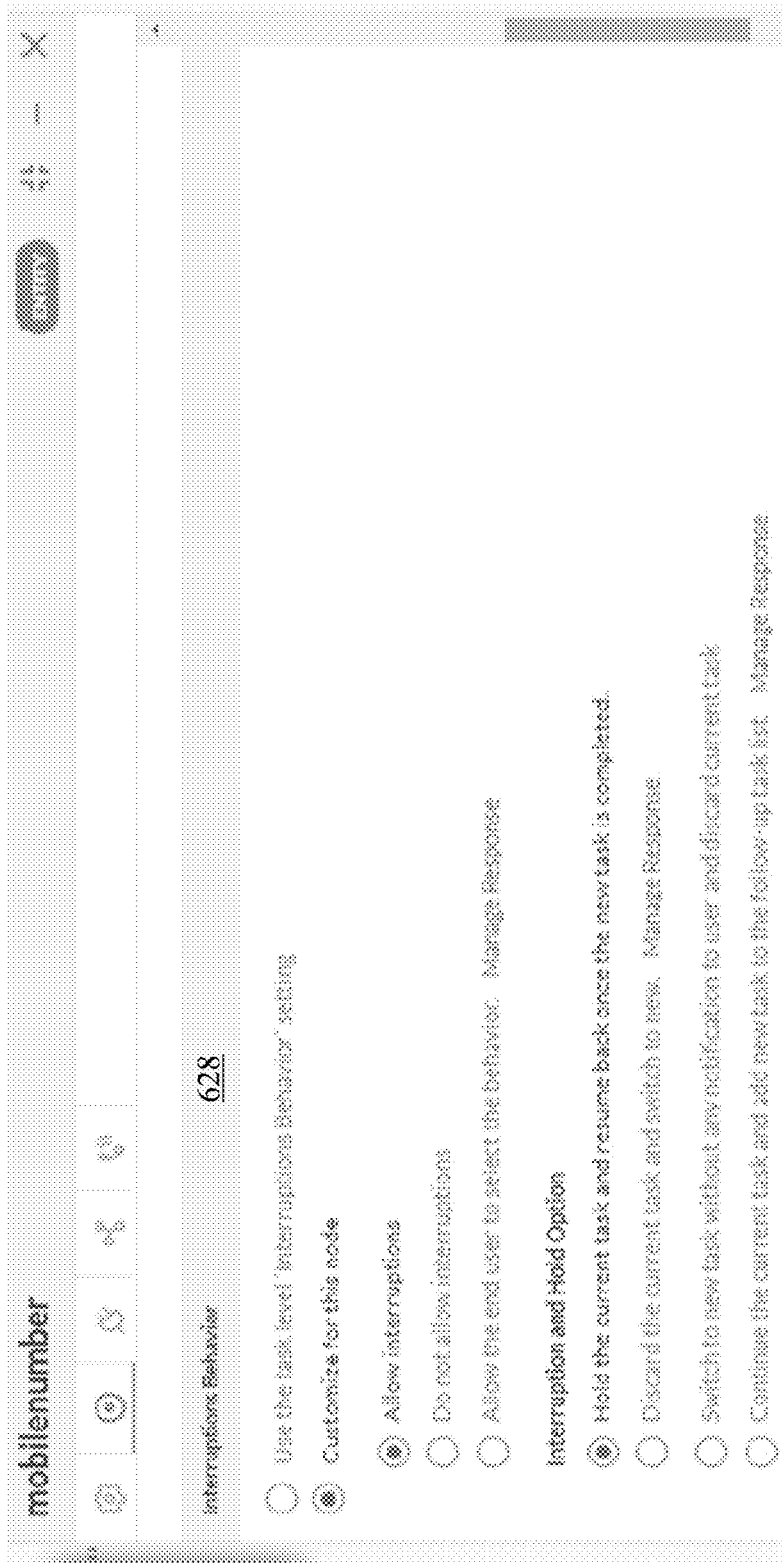

FIG. 7F shows additional properties or functionality that can be added by the developer and which can flow (e.g., incorporated) into the developer view. For example, the additional properties can include custom tags or predefined tags relating to interruptions behavior as designated by reference numeral 628. The interruptions behavior can include tags related to, e.g.,
  (i) Use the task level interruptions behavior settings;
  (ii) Customize the interruption for a particular node, e.g., allow interrupts, do not allow interruptions or allow the end user to select the behavior; and
  (iii) Provide interruption and hold options.

In embodiments, the interruption and hold options can include, e.g., hold the current task and resume back once the new task is complete, discard the current task and switch to a new task, switch to a new task without any notification to the user or discard the current task, or continue the current task and add new task to the follow-up task list. In any of these different scenarios, the particular options can be automatically selected in the developer view and associated with a particular node for use by the developer.

Exemplary Applications

FIG. 8 shows a side-by-side comparison between a designer view 800 and developer view 802 in accordance with aspects of the present disclosure. In particular, FIG. 8 shows the automatic generation and creation of the dialog task from the utterances 805*a*, 810*a*, 815*a*, 820*a* within the designer view 800. The nodes include: (i) a user intent node 805 associated with utterance 805*a*; (ii) an entity node 810 associated with utterances 810*a*; (iii) a message node 815 associated with utterances 815*a*; and an entity node 820 associated with utterances 820*a*, each of which are linked together by a link 825 within the developer view 800. The nodes 805, 810, 815, 820 can include the different comments, annotations and tags as represented at reference numeral 830, which may be added based on tags or annotations in the designer view 800, for developer access to easily integrate such into the functionality of the bot application.

FIG. 9 shows a side-by-side comparison between a designer view 800 and developer view 802, with a merging and linking of nodes in the developer view 802. In this representation, the designer view 800 includes a bot utterance 835 associated with entity node 840 with requested information (e.g., list of items to be enumerated, account type and the utterance 835). In the designer view 800, a user utterance 850 is then provided, e.g., a user message requesting all accounts. The bot utterance 835 and the user utterance 850 correspond to the entity node 840. The conversation designer may add multiple user utterances as responses to the bot utterance 835. In this example, when the bot utterance 835 is "please provide your account type", the user utterance 850 as a response may be: checking account, savings account, or from all accounts. Accordingly, the message nodes 850a, 850b, 850c are associated with user utterances 850 which include checking account, a savings account, or all accounts respectively. As the entity node 840 is common to each of the nodes 850a, 850b, 850c, the developer view 802 will only need to use the entity node 840 a single time with all of the nodes 850a, 850b, 850c. This is a merging operation. Also, the message node 855 corresponds to a thank you message in the designer view 800. The illustrated example of the return message 855a corresponds to the bot response when the user provides "all accounts" in 850.

FIG. 10 shows a developer view with a node in both a contracted view and an expanded view of a bot action node. For example, the contracted view shows a node for a bot action, i.e., validate number. The expanded view shows the service node and the script node required for the bot action. The service node will retrieve the account information via an API and the script node will provide logic to validate the number.

FIG. 11 illustrates a database schema with shared definitions for the designer tool and developer tool in accordance with aspects of the present disclosure. More specifically, FIG. 11 illustrates a database schema which defines at least one database entity using which server 1012 outputs instructions to create a scene and the dialog task. In embodiments, the database schema may include the database entities: Scene 1100, SceneMessage 1102, or SceneMessageConfig 1104, or enumerations: MessageTypes(ENUM) 1106, or AnnotationTypes(ENUM) 1108, having, for example, a one-to-one, one-to-many, or a many-to-one relationship with each other.

In embodiments, each database entity may include attributes, attribute datatype, and information whether the attribute is a primary key (PK), a foreign key (FK), or the like. In one example, the database entity "Scene" 1100 may include attributes such as sceneId, sceneName, createdBy, createdTime, or the like. Each of these attributes can be of datatypes: string, dateTime, as an example. For example, the sceneId may be a string and the primary key of the entity. The sceneMessage 1102 database entity can include strings, integers, objects and datetime data types, as examples. For example, in embodiments, the sceneMessage 1102 database entity can include messageID as a string and the primary key of the database entity. The MessageTypes(ENUM) 1106 can be a user message, bot message question or a bot message information, as described with respect to FIG. 5B for example.

FIG. 12A illustrates a sample conversation between a bot and a user. The user initiates the conversation with the intent to book a flight and the bot presents a series of prompts to fulfill the intent. The user replies to the bot prompts which include entity values required by the bot to fulfill the intent. The sample conversation between the bot and the user can be used to populate the database tables 12B and 12C, as shared definitions. For example, the tables (e.g., database entities) shown in FIGS. 12B and 12C are shared such that both the developer tool and the designer tool, e.g., the server 1012, can use the tables to create visualizations in both the designer view and the developer view (e.g., nodes, connections of nodes, etc.). The tables shown in FIGS. 12B and 12C can be populated as, for example, the designer creates a scene. In this way, the developer view and the designer view can use a common table or definition in creating the different views.

FIG. 12B includes a sceneMessage database entity (table) illustrated in FIG. 11, which may include attributes such as messageId, sceneId, seqNum, parentMessageId, transitions, messageText, messageType, entityType, or the like. One or more of these attributes may be used to create the visualization of the scene or the dialog task. The values of the attributes correspond to the scene illustrated in FIG. 12A. The value of attributes of messageType, entityType may be added to the database table based on the tags, annotation added, or by determining the messageType or entityType based on a classification model. In embodiments, the classification model may be used on utterances which are partly annotated or not annotated. Some of the attributes of the sceneMessage database entity illustrated in FIG. 11 have not been illustrated in the sceneMessage table in FIG. 12B for the sake of simple description and illustration.

FIG. 12C includes a SceneMessageConfig database entity (table) which includes information related to annotations, tags, or other settings related to the messages in FIG. 12A. The SceneMessageConfig database is also shown in FIG. 11. The Intelligent Design and Development Platform 1050 may use the database tables illustrated in FIG. 12B and FIG. 12C to output instructions to create a visualization of the scene in the conversation design tool 300 and a visualization of the dialog task in the developer tool 305. In this manner, the scene and the dialog task share the same definition. Any changes made in the scene in the conversation design tool 300 or in the dialog task in the developer tool 305 are reflected as changes in the database tables illustrated in FIG. 12B and FIG. 12C. For example, a change of entity annotation in the scene may change the attribute of annotationValue. As the server 1012 uses the same database tables to create the dialog task visualization in the developer tool 305, the change of entity annotation may automatically reflect as a change in the entity type in the dialog task.

FIG. 12D illustrates the types of dialog task nodes required by the bot to automate the conversation illustrated in FIG. 12A. The types of dialog task nodes added in the developer tool 305, to automate the conversation designed in the conversation designer tool 300, may be determined based on rules which may be, for example, added as part of the software instructions executed by the server 1012 to implement Intelligent Design and Development Platform 1050. In one example, server 1012 may determine the dialog task nodes to be added to the developer tool 305 based on the value of the attributes—messageText or messageType. The server 1012 may determine the connections between the dialog task nodes based on the value of the attribute—transitions. Based on the example database tables illustrated in FIG. 12B and FIG. 12C, the messageConfigId: C1 corresponds to messageId: V1 which includes an annotationType: intent and an annotationValue: Book_flight. This information may be added to the table based on the annotations added by the conversation designer to the scene with the sceneId: S1. Based on this information and the information corresponding to messageId: V1 in the sceneMessage table, the server 1012 may create an intent node: Book_flight in the developer tool 305. For the messageId: V2, based on the messageType: BOT_MESSAGE_QUESTION, an entity node may be added in the developer tool 305. Based on the transition attribute corresponding to messageId: V1, the server 1012 may connect the intent node with the entity node. The entityType setting in the entity node may be configured using the annotationValue corresponding to messageConfigId: V2 in the sceneMessageConfig table. This annotationValue may be added based on the annotation—"City", added by the conversation designer to "NewYork" in the user message: from NewYork in the scene illustrated in FIG. 12A.

In embodiments, the definitions provided in the database can be exported into different forms. For example, FIG. 13 illustrates part of a JSON file which is created when the dialog task is exported; although other types of files are also contemplated herein. The JSON file may include at least part of the information illustrated in the database tables of FIG. 12B and FIG. 12C. In embodiments, the JSON file may include one or more JSON arrays which include data corresponding only to the scene, for example the data illustrated in 1330, one or more JSON arrays which include data corresponding only to the dialog task, for example the data illustrated in 1310, and one or more JSON arrays which include data corresponding to both the scene and the dialog task, for example the data illustrated in 1320. The user messages in 1330 may be the USER_MESSAGE which comes after a BOT_MESSAGE_QUESTION illustrated in FIG. 12B. Once the file is imported into another environment (e.g., device or computing system), it will be used to create a shared definition, for example, one or more database tables for creating the designer view (e.g., scenes) and the developer view (e.g., dialog tasks). Instead of importing a first file for the dialog task and a second file for the scene, the JSON file described above advantageously enables a unified method to import the bot configuration (e.g. dialog task) and the scene configuration.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating bot applications, the method comprising:
   receiving one or more tags corresponding to a scene within a designer view of a designer tool, implemented using a computing system, wherein the one or more tags further comprise one or more tags of one or more utterances of the scene as requiring a service call configured to link to an external computing system;
   providing, in a shared database between the designer tool and a developer tool, one or more shared definitions corresponding to the scene, wherein the one or more shared definitions are defined as a database schema that includes database entities used to: define a plurality of attributes corresponding to a conversation within the scene, and create one or more nodes within a dialog task based on the conversation; and
   creating automatically the dialog task in a developer view of the developer tool using the one or more shared definitions from the shared database corresponding to the scene wherein the one or more shared definitions comprise the one or more tags that are associated with one or more service nodes configured to link to an external computing system, the dialog task being implemented using the computing system and comprising the one or more nodes corresponding to the scene.

2. The computer-implemented method of claim 1, wherein the one or more shared definitions within the shared database are used to create both the developer view and the designer view.

3. The computer-implemented method of claim 1, wherein the shared database further comprises records that are used to output instructions to create part of the designer view or the developer view.

4. The computer-implemented method of claim 1, wherein two or more of the database entities comprise a one-to-one, a one-to-many, or a many-to-one relationship with each other, and wherein values of the plurality of attributes of the two or more of the database entities are populated in real-time when the scene is created.

5. The computer-implemented method of claim 1, wherein the at least one of the attributes is used to create a visualization of the designer view and the developer view.

6. The computer-implemented method of claim 1, wherein the scene includes an entity and an entity tag, and a change of the entity tag in the scene automatically reflects as a change in an entity type in the dialog task using the one or more shared definitions.

7. The computer-implemented method of claim 1, wherein the one or more nodes comprise an entity node, a message node, an intent node, a service node or a script node based on the one or more shared definitions.

8. The computer-implemented method of claim 1, wherein the scene includes a sequence of message texts corresponding to a message type comprising at least one of: a user message, a bot question or a bot information;
   the message texts are associated with tag types and tag values;
   the sequence of message texts of the user message are associated with a sequence of the bot question and the bot information; and
   the sequence of the bot question and the bot information are linked to at least another bot question and/or bot information based on the user message;
   wherein the message type, the tag types and the tag values are defined as the one or more definitions.

9. The computer-implemented method of claim 1, wherein the one or more shared definitions further comprise one or more utterances of the scene tagged as a response to a confirmation question.

10. A system comprising:
    a processor; and
    a memory comprising programmed instructions stored thereon with the processor configured to execute the stored programmed instructions to:
    receive one or more tags corresponding to a conversation design within a designer view of a designer tool, wherein the one or more tags further comprise one or more tags of one or more utterances of the scene as requiring a service call configured to link to an external computing system;
create a bot definition in a developer view of a developer tool; and
provide, in a shared database between the designer tool and the developer tool, one or more shared definitions corresponding to the created conversation design and the created bot definition such that any change in the created conversation design or the created bot definition automatically changes the corresponding bot definition or the conversation design, respectively, based on the one or more shared definitions, wherein the one or more shared definitions are defined as a database schema that includes database entities used to: define a plurality of attributes corresponding to a conversation within the conversation design, and create one or more nodes within the bot definition based on the conversation, wherein the one or more shared definitions comprise one or more the one or more tags that are associated with one or more service nodes configured to link to an external computing system.

11. The system of claim 10, wherein the bot definition comprises a dialog task and the conversation design comprises a scene.

12. The system of claim 10, wherein the at least one of the attributes is used to create a visualization of the designer view and the developer view.

13. The system of claim 11, wherein the scene includes an entity and an entity tag, and a change of the entity tag in the scene automatically reflects as a change in an entity type in the dialog task using the one or more shared definitions.

14. The system of claim 10, wherein the one or more shared definitions within the shared database are used to create both the developer view and the designer view.

15. The system of claim 10, wherein the shared database further comprises records that are used to output instructions to create part of the designer view or the developer view.

16. The system of claim 10, wherein two or more of the database entities comprise a one-to-one, a one-to-many, or a many-to-one relationship with each other, and wherein values of the plurality of attributes of the two or more of the database entities are populated in real-time when the conversation design is created.

17. The system of claim 10, wherein the one or more nodes comprise an entity node, a message node, an intent node, a service node or a script node based on the one or more shared definitions.

18. A non-transitory computer readable medium having stored thereon instructions comprising executable code which when executed by one or more processors, causes the one or more processors to:
receive one or more tags corresponding to a scene within a designer view of a designer tool, implemented using a computing system, wherein the one or more tags further comprise one or more tags of one or more utterances of the scene as requiring a service call configured to link to an external computing system;
provide, in a shared database between the designer tool and a developer tool, one or more shared definitions corresponding to the scene, wherein the one or more shared definitions are defined as a database schema that includes database entities used to: define a plurality of attributes corresponding to a conversation within the scene, and create one or more nodes within a dialog task based on the conversation; and
create automatically the dialog task in a developer view of the developer tool using the one or more shared definitions from the shared database corresponding to the scene wherein the one or more shared definitions comprise the one or more tags that are associated with one or more service nodes configured to link to an external computing system, the dialog task being implemented using the computing system and comprising the one or more nodes corresponding to the scene.

19. The non-transitory computer readable medium of claim 18, wherein the one or more shared definitions shared within the shared database are used to create both the developer view and the designer view.

20. The non-transitory computer readable medium of claim 18, wherein the shared database further comprises records that are used to output instructions to create part of the designer view or the developer view.

21. The non-transitory computer readable medium of claim 18, wherein two or more of the database entities comprise a one-to-one, a one-to-many, or a many-to-one relationship with each other, and wherein values of the plurality of attributes of the two or more of the database entities are populated in real-time when the scene is created.

22. The non-transitory computer readable medium of claim 18, wherein the at least one of the attributes is used to create a visualization of the designer view and the developer view.

23. The non-transitory computer readable medium of claim 18, wherein the scene includes an entity and an entity tag, and a change of the entity tag in the scene automatically reflects as a change in an entity type in the dialog task using the one or more shared definitions.

24. The non-transitory computer readable medium of claim 18, wherein the one or more nodes comprise an entity node, a message node, an intent node, a service node or a script node based on the one or more shared definitions.

* * * * *